(12) United States Patent
Sereboff

(10) Patent No.: US 8,987,367 B2
(45) Date of Patent: Mar. 24, 2015

(54) ENERGY ABSORBING COMPOSITION AND IMPACT AND SOUND ABSORBING APPLICATIONS THEREOF

(71) Applicant: Joel L. Sereboff, Owings Mills, MD (US)

(72) Inventor: Joel L. Sereboff, Owings Mills, MD (US)

(73) Assignee: Joel L. Sereboff, Owings Mills, MD (US)

( * ) Notice: Subject to any disclaimer, the term of this patent is extended or adjusted under 35 U.S.C. 154(b) by 5 days.

(21) Appl. No.: 13/826,978

(22) Filed: Mar. 14, 2013

(65) Prior Publication Data

US 2015/0050436 A1    Feb. 19, 2015

Related U.S. Application Data

(60) Continuation-in-part of application No. 13/766,447, filed on Feb. 13, 2013, now Pat. No. 8,729,174, which is a division of application No. 12/792,354, filed on Jun. 2, 2010, now Pat. No. 8,541,496, which is a continuation of application No. 11/647,601, filed on Dec. 29, 2006, now Pat. No. 7,754,791.

(60) Provisional application No. 60/754,945, filed on Dec. 29, 2005.

(51) Int. Cl.
  *C09B 67/00*    (2006.01)
  *C08J 9/16*     (2006.01)

(52) U.S. Cl.
  USPC ............................................ 524/502; 521/59

(58) Field of Classification Search
  USPC ....................................................... 524/502
  See application file for complete search history.

(56) References Cited

U.S. PATENT DOCUMENTS

| 4,255,202 A | 3/1981 | Swan, Jr. |
|---|---|---|
| 4,663,385 A | 5/1987 | Chang et al. |
| 5,475,882 A | 12/1995 | Sereboff |
| 5,507,866 A | 4/1996 | Drew et al. |
| 5,590,430 A | 1/1997 | Sereboff |
| 5,713,544 A | 2/1998 | Wolf et al. |
| 5,869,164 A | 2/1999 | Nickerson et al. |
| 6,087,407 A * | 7/2000 | Coronado et al. ............... 521/64 |
| 6,234,867 B1 | 5/2001 | Fanelli |
| 6,237,598 B1 | 5/2001 | Sereboff |
| 6,347,411 B1 | 2/2002 | Darling |
| 6,509,385 B2 | 1/2003 | Sereboff |
| 6,598,358 B1 | 7/2003 | Schwertfeger et al. |
| 6,626,403 B1 | 9/2003 | Wolf et al. |
| 6,787,057 B2 | 9/2004 | Tateishi et al. |
| 7,766,963 B2 | 8/2010 | Laghi |
| 2001/0050196 A1 | 12/2001 | Okada et al. |
| 2003/0190453 A1 | 10/2003 | Sereboff |
| 2005/0086823 A1 | 4/2005 | Subramonian et al. |
| 2005/0100728 A1 | 5/2005 | Ristic-Lehmann et al. |
| 2007/0003759 A1 | 1/2007 | Pham |
| 2011/0076920 A1 | 3/2011 | Jackson |

OTHER PUBLICATIONS

Deep Springs Technology http://teamdst.com/pdf/HollowShells_MTG119-A.pdf., pp. 1-4. Date unkown but prior to filing date of the application.

Karen Wood "Microspheres: Fillers Filled with Possibilites" http://www.compositesworld.com/articles/microspheres-fillers-filled-with-possibilities; Apr. 1, 2008.

R. Crotchet "Evaluation of Polystyrene Hollow Plastic Spheres to Enhance Hydrualic Fluid Compressibility" U.S. Army Armament Research and Developement Center;: http://www.dtic.mil/dtic/tr/fulltext/u2/a139135.pdf Feb. 1984, pp. 1-36.

* cited by examiner

*Primary Examiner* — Hui Chin
(74) *Attorney, Agent, or Firm* — Ditthavong & Steiner, P.C.

(57) ABSTRACT

A substantially non-elastic incompressible composition, which substantially does not quickly self-level under standard operating conditions, includes: a suspending agent which reacts substantially as a solid when subjected to forces below a critical force, and which becomes substantially flowable when subjected to forces above said critical force. Aspects include compositions comprising one or more of ceramic microparticulates, flexible-walled microparticulates, celled macroparticulates, and fibers dispersed within the suspending agent, and energy absorbing applications thereof. Another aspect comprises thin-walled macrospheres containing a substantially non-elastic incompressible composition.

11 Claims, 23 Drawing Sheets

ENERGY ABSORBING COMPOSITION AND IMPACT AND SOUND ABSORBING APPLICATIONS THEREOF

DESCRIPTION

This application is a continuation-in part of U.S. Utility patent application Ser. No. 13/766,447 filed on Feb. 13, 2013, which is a division of U.S. Utility patent application Ser. No. 12/792,354 filed Jun. 2, 2010, which in turn is a continuation of U.S. Utility patent application Ser. No. 11/647,601 filed Dec. 29, 2006 now U.S. Pat. No. 7,754,791 issued on Jul. 13, 2010, and claims the benefit of U.S. Provisional Application No. 60/754,945 filed Dec. 29, 2005. The aforementioned provisional application's disclosure is incorporated herein by reference in its entirety.

FIELD OF THE INVENTION

The present inventive subject matter relates to compositions which provide an incident energy absorbing property.

BACKGROUND OF THE INVENTION

It has been known in connection with industrial, residential and recreational environments that for purposes of safety of individuals as well as comfort, the damping of incident sound energy in a region can become a very important consideration. It has also been known to use a variety of foams, gels, and various forms of rigid, solid materials such as ceiling tiles, to dampen sound.

However, known materials which can be used for damping sound have a number of deficits. Known materials which may have enhanced sound damping properties may react as a fluid even when subjected to no forces, making it difficult to secure at or near a structure where damping is needed. It may be difficult to manufacture these materials, or to manufacture containers in which they can be held without leaking. In addition, known combinations of sound absorbing elements may function well independently, but do not enhance sound absorption when used in combination. In addition, such known materials may fail to utilize their maximum dimension (often perpendicular to the direction of sound travel or the travel of an incident force carrying other energy) due to poor dispersion of sound or other energy within the material.

Moreover, it has been known in connection with industrial, residential and recreational environments that for purposes of safety of individuals as well as comfort, the damping of incident forces can become a very important consideration. It has also been known to use a variety of foams and gels such as those in seat cushions and wrist rests to dampen impacts or other compressive forces.

However, known materials which can be used for damping impacts or other compressive forces have a number of deficits. The known materials may be compressible, and thus elastically produce uncomfortable resiliency against a body, especially in medical uses where the user may be unable to feel the resilient pressure, or unable to move their body to accommodate it over time. Known materials which may have desirable impact- or contact-damping properties, or even contact distribution properties, may be difficult to manufacture. It may also be difficult to manufacture containers in which these materials can be held without leaking. In addition, known combinations of impact absorbing elements may function well independently, but do not enhance compression absorption when used in combination. Processes for making known materials for absorbing energy may be time-consuming.

In particular, many known compositions for absorbing incident energy are disadvantageously elastic or compressible. Such materials include those with memory such as block-polymer gels, which are in many ways inefficient at absorbing energy; can be costly to manufacture, requiring lengthy manufacturing processes and potentially the application of heat; and which are poorly suited for many applications due to the identifiable and unattractive physical sensation of contact with a gelatinous material. Other known compositions for absorbing incident energy are viscous fluids which self-level under standard operating conditions, which makes them disadvantageous in some environments for maintaining a distribution of energy-absorbing particulates therein over a prolonged period of time. Other known compositions for absorbing incident energy comprise viscous fluids which can leak from their containers even when subjected to no external force Other known compositions for absorbing incident energy comprise one species of microparticulate or macroparticulate alone, but do not provide any particulate-particulate interaction, let alone the multiple types of interactions needed for effective and efficient energy absorption. Other known compositions for absorbing incident energy are of a high density and high weight, and therefore not suitable for many applications. Other known compositions for absorbing incident energy flow so much that an external force effects the integrity of an original distribution or proportion of elements therein, where the originally-provided uniformity does not remain consistent under the imposition of an external force. Other known compositions for absorbing incident energy provide lubricosity between suspended particulates, thereby wasting the potential use of friction between articulates as an absorbing force.

SUMMARY OF THE INVENTIVE ASPECTS

The present inventive subject matter address the above deficits by being a substantially non-elastic incompressible composition which substantially does not quickly self-level under standard operating conditions. The composition comprises a suspending agent which reacts substantially as a solid when subjected to forces below a critical force, and which becomes substantially flowable when subjected to forces above said critical force; ceramic microparticulates dispersed within the suspending agent; flexible-walled microparticulates dispersed within the suspending agent; and celled macroparticulates dispersed within the suspending agent. The composition provides an incident energy absorbing property.

In some embodiments, the absorbing property provides absorption of energy from an incident force. In some embodiments, the composition is disposed in a container which changes in shape in response to the incident force.

In some embodiments, the composition substantially exhibits dilatancy above the critical force.

In some embodiments, some of the microparticulates or macroparticulates impact others of the microparticulates or macroparticulates to substantially absorb the incident energy.

In some embodiments, some of the microparticulates or macroparticulates deform upon impact with others of the microparticulates or macroparticulates to substantially absorb the incident energy.

In some embodiments, friction between some of the microparticulates or macroparticulates increases as the magnitude of the incident force increases.

In some embodiments, the ceramic microparticulates comprise substantially spherical microparticulates ranging from approximately 10 to approximately 800 micrometers in diameter.

In some embodiments, the flexible-walled microparticulates comprise substantially spherical microparticulates ranging from approximately 10 to approximately 800 micrometers in diameter.

In some embodiments, the flexible-walled microparticulates exhibit a property of resiliency when in contact with the ceramic microparticulates.

In some embodiments, the celled macroparticulates range from approximately 0.5 millimeters to approximately 8 millimeters in diameter.

In some embodiments, the celled macroparticulates comprise material selected from polystyrene, polyethylene, polypropylene, air-chambered particles, blown particles, and combinations thereof.

In some embodiments, the ratio of the macroparticulates to the microparticulates ranges from approximately 1:2 to approximately 1:2000.

In some embodiments, the microparticulates and the macroparticulates are suspended in substantially fixed positions within the composition.

In some embodiments, the incident energy comprises sound energy. In some embodiments, the microparticulates and the macroparticulates convert some of the sound energy into heat. In some embodiments, the composition increases this conversion through diffraction of the sound energy.

In some embodiments, the composition is disposed in a container configured for placement within the exterior of a vehicle.

In some embodiments, the composition is disposed in a container configured for placement within a speaker housing.

In some embodiments, the composition is disposed in a container configured for use at a wall, roof, ceiling, floor, or door of a building.

In some embodiments, the composition is disposed in a container configured for placement within headphones.

In some embodiments, the incident energy comprising sound energy, and the microparticulates and macroparticulates convert some of the sound energy into motion of the microparticulates and macroparticulates within the suspending agent.

In some embodiments, some of the microparticulates are substantially hollow.

In some embodiments, the composition is disposed in a fluid-impervious container.

In some embodiments, the composition is disposed in a flexible-walled container.

In some embodiments, the composition is disposed in a container configured for use as a palm rest for a keyboard, mouse, or workstation.

In some embodiments, the composition is disposed in a container configured for use as a seat or seat cushion.

In some embodiments, the composition is disposed in a container configured for use as a seatback or seatback cushion.

In some embodiments, the composition is disposed in a container configured for placement at, around, or under the body of an animal.

In some embodiments, the composition serves as an interface between an orthopedic device and the soft tissue of any member of the animal kingdom.

In some embodiments, the composition further comprises an aerogel dispersed within the suspending agent. The aerogel may comprise nanoparticulates. In some embodiments, the composition comprises nanoparticulates ranging from approximately 0.6 nanometers to approximately 800 nanometers in width.

In some embodiments, the composition further comprises an aerogel layered with the suspending agent. The aerogel may comprise nanoparticulates. In some embodiments, the composition comprises nanoparticulates ranging from approximately 0.6 nanometers to approximately 800 nanometers in width.

In some embodiments, the composition is disposed in a jacket comprising an aerogel.

In some embodiments, the suspending agent comprises an aqueous solution of acrylic acid polymer and hydrocarbon distillate containing ammonium hydroxide; water; and glycerin.

In some embodiments, the suspending agent comprises an aqueous solution of acrylic acid polymer and hydrocarbon distillate containing ammonium hydroxide; and an emulsion of oil and water.

In some embodiments, the suspending agent is approximately 20-80% by weight of the total composition.

In some embodiments, the suspending agent may comprise a natural viscofier. In some embodiments, the natural viscofier may be starch, cellulose, alginate, protein, or combinations thereof.

In some embodiments, the suspending agent may comprise a synthetic viscofier. In some embodiments, the synthetic viscofier may be hydrophobically modified alkali swellable emulsion (HASE), acid-swelling associative thickener, or combinations thereof.

In some embodiments, the suspending agent may comprise a fluid base. In some embodiments, the fluid base may be synthetic 1,2,3 trihydroxy propane; trihydric alcohol; trihydric glycerol; fat based glycerols; oil based glycerols; fatty acids; methyl fatty acids; hydrogenated starch hydrolysates; sorbitol; polyol; polymers; hydroxides; or combinations thereof.

In some embodiments, the composition further comprises hollow macroparticulates dispersed within said suspending agent.

One or more of any of the above embodiments may be present in further embodiments of the invention.

The present inventive subject matter also relates to a substantially non-elastic incompressible composition which substantially does not quickly self-level under standard operating conditions. The composition may comprise: a suspending agent which reacts substantially as a solid when subjected to forces below a critical force, and which becomes substantially flowable when subjected to forces above the critical force; and particulates dispersed within the suspending agent. The composition may substantially exhibit dilatancy above the critical force. In some embodiments, the composition absorbs incident energy.

The present inventive subject matter also relates to a method of manufacturing a substantially non-elastic incompressible composition which substantially does not quickly self-level under standard operating conditions. The method comprises: mixing glycerin with water at high shear to form a first interim mixture; adding celled macroparticulates to the first interim mixture while mixing at low shear to form a second interim mixture; adding ceramic microparticulates and flexible-walled microparticulates to the second interim mixture while mixing at low shear to form a third interim mixture; adding an aqueous solution of acrylic acid polymer and hydrocarbon distillate containing ammonium hydroxide to the third interim mixture while mixing at low shear to form the composition; and combinations thereof.

The present inventive subject matter also relates to a substantially non-elastic incompressible composition which substantially does not quickly self-level under standard operating conditions, the composition formed according to a method comprising: mixing glycerin with water at high shear to form a first interim mixture; adding celled macroparticulates to the first interim mixture while mixing at low shear to form a second interim mixture; adding ceramic microparticulates and flexible-walled microparticulates to the second interim mixture while mixing at low shear to form a third interim mixture; and adding an aqueous solution of acrylic acid polymer and hydrocarbon distillate containing ammonium hydroxide to the third interim mixture while mixing at low shear to form the composition.

The present inventive subject matter also relates to a system for manufacturing a substantially non-elastic incompressible composition which substantially does not quickly self-level under standard operating conditions. The system comprises: means for mixing water with glycerin at high shear; means for mixing an aqueous solution of acrylic acid polymer and hydrocarbon distillate containing ammonium hydroxide with the water and the glycerin at low shear; means for dispersing foamed polymer particulates in the mixture at low shear; and means for dispersing ceramic microparticulates and flexible-walled microparticulates in the mixture at low shear.

BRIEF DESCRIPTION OF THE FIGURES

In the detailed description of the invention presented below, reference is made to the accompanying drawings in which.

DETAILED DESCRIPTION OF THE INVENTION

Figure 1:
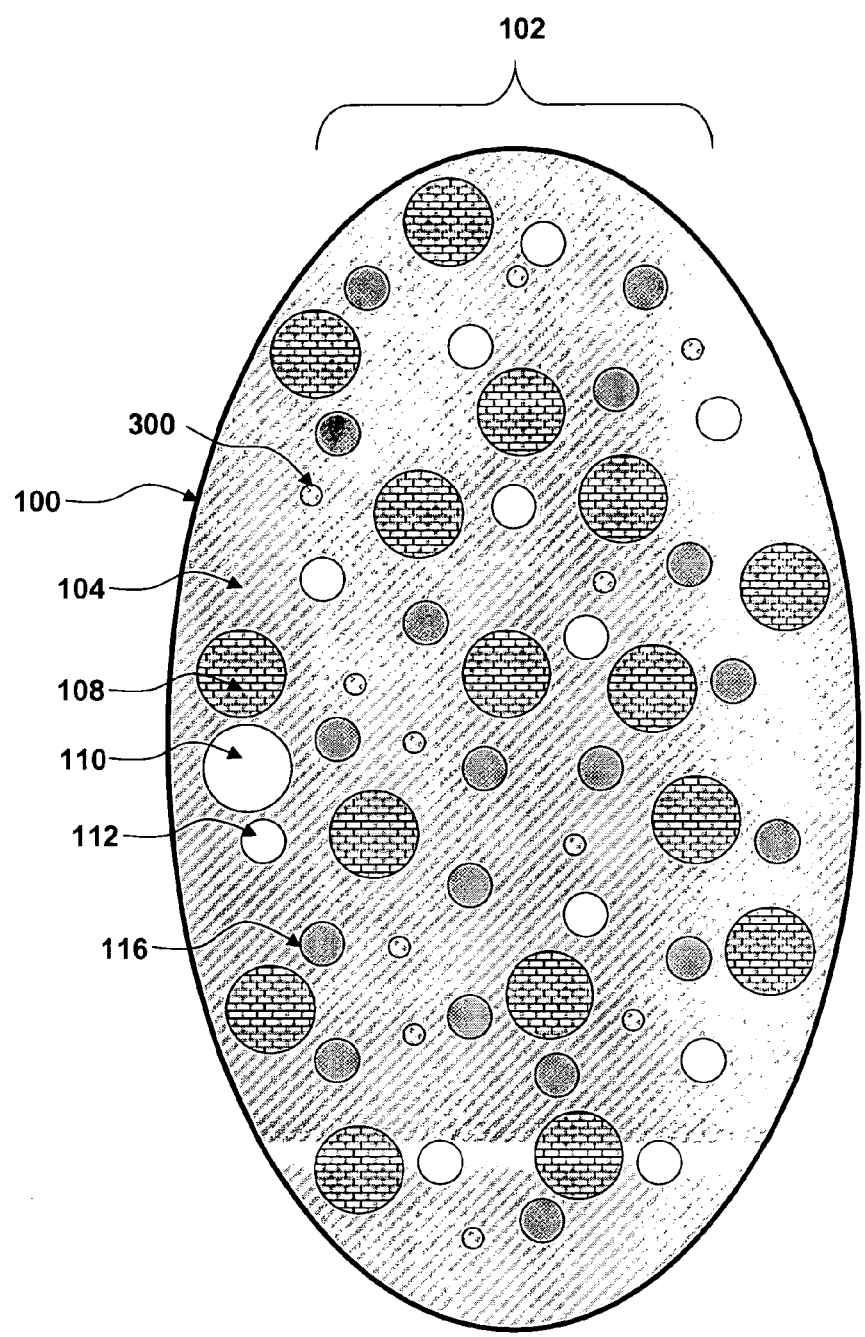
FIG. 1 is a diagram showing an embodiment of a substantially non-elastic incompressible composition which substantially does not quickly self-level under standard operating conditions.

In the following detailed description, reference is made to the accompanying drawings, which form a part hereof, and in which are shown by way of illustration specific embodiments in which the invention may be practiced. In this regard, terminology such as "first," "then," "afterwards," "before," "next," "finally," "above," "below," "top," "bottom," "front," "back," "leading," "trailing," etc., is used with reference to the drawing being described. Because the processes and methods of the present invention can be performed in a number of different orders, and because the individual elements of the apparatus and systems of the present invention may be configured in a number of different orders, the above terminology is used for purposes of illustration and is in no way limiting. It is to be understood that other embodiments may be utilized and logical changes may be made without departing from the scope of the present invention. The following detailed description, therefore, is not to be taken in a limiting sense, and the scope of the present invention is defined by the appended claims.

Figure 8:
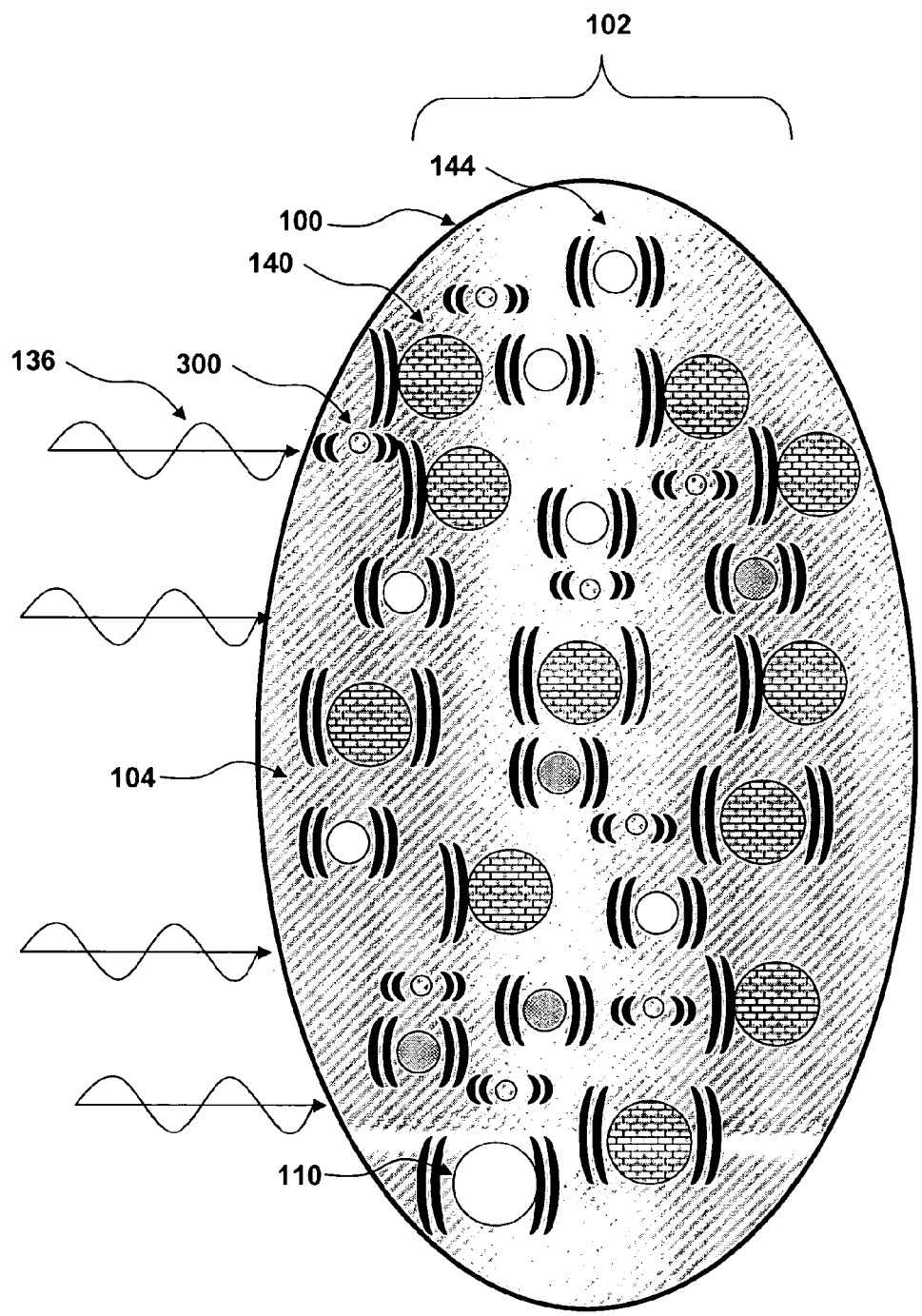
FIG. 8 is a diagram showing dissipation of sound energy incident on the composition.

Although a number of discrete embodiments are described below, it is to be understood that these are merely non-limiting examples, and that any given embodiment of the invention may comprise some of the features of one shown embodiment, and/or some of the features of another shown embodiment. For example, although aerogel nanoparticulates 300 are shown in FIG. 1 and FIG. 8, but not in FIG. 10, the use of aerogel nanoparticulates in fact could easily and advantageously be optionally used in the embodiments of FIGS. 10, 11, 12, and others. Other modifications between embodiments will be clear to one skilled in the art upon reading the following disclosure. Similarly, the order of steps in the methods disclosed herein may be varied for advantageous results. Those disclosed are merely non-limiting examples.

Energy Absorbing Composition

As shown in FIG. 1, the present inventive subject matter relates to a substantially non-elastic incompressible composition which substantially does not quickly self-level under standard operating conditions. The term non-elastic incompressible may be construed as meaning that the composition, after having been subjected to an external force, does not return or attempt to return substantially to the shape it had before such force was applied. This elasticity and incompressibility may be viewed in contrast to that of some block-polymer gels, for example, which may deform when subjected to an external force, but which attempt to return to their original shapes, and which substantially return to their original shapes after the external force is removed. A substantially non-elastic incompressible composition may thus exhibit significant non-elastic incompressible behavior; for example, more than 50% of the total composition may exhibit such behavior. As non-limiting examples, 50%, 60%, 70%, 80%, 85%, 90%, 95%, 98%, 99%, or about 100% of the total composition may exhibit the non-elastic incompressible behavior. The term self-level may be construed as meaning to flatten to the edges of a container under the force of gravity. As examples, pure water, or pure oil, will self-level in their liquid forms. A material which does not self-level may, for example, be shaped into a non-level structure by an externally applied force, and then essentially remain in that non-level structure upon removal of the force. The term quickly may be construed as occurring over a time period of no more than approximately ten minutes. A composition which substantially does not quickly self-level may thus, for example, not exhibit significant self-leveling behavior in less than ten minutes after removal of an externally applied force. As non-limiting examples, 90%, 95%, 98%, 99%, or about 100% of the total composition may not exhibit significant self-leveling behavior in less than ten minutes after removal of an externally applied force.

The sizes of the particulates and container shown in FIG. 1 and the following figures are not drawn to scale; the particulate sizes have been exaggerated for demonstration purposes.

The composition 102 comprises a suspending agent 104 which reacts substantially as a solid when subjected to forces below a critical force, and which becomes substantially flowable when subjected to forces above said critical force. A suspending agent 104 which reacts substantially as a solid may thus exhibit significant solid reactions when subjected to forces below a critical force; for example, more than 50% of the suspending agent may exhibit a definite volume and a definite shape, and may present itself as essentially infinitely viscous when subjected to a force below said critical force. As non-limiting examples, 50%, 60%, 70%, 80%, 85%, 90%, 95%, 98%, 99%, or about 100% of the total composition may exhibit a definite volume and a definite shape, and may present itself as essentially infinitely viscous when subjected to a force below said critical force. A composition which becomes substantially flowable above said critical force may thus, for example, significantly flow locally around the situs of said critical force. As non-limiting examples, 50%, 60%, 70%, 80%, 85%, 90%, 95%, 98%, 99%, or about 100% of that portion of the composition localized at the situs of said critical force may flow above said critical force. Materials exhibiting the behaviors given above may be generally called Bingham Fluids. Some known materials which exhibit this behavior comprise Bingham Plastics, Caisson Fluids, and pseudosolids. As an example of a critical force sufficient to permit an embodiment of the composition disclosed herein to flow, the force provided merely by the resting of a user's palms on a 1-inch thick piece of the disclosed composition under gravity has been observed to be sufficient to allow the material to flow into conformance with the shape of the user's palms, and additional forces provided by slight movements of the user's palms are sufficient to allow the material to flow into conformance with the new position of the user's palms. As discussed below, however, the material simultaneously mitigates this force, so that while the material may flow at the situs of contact where a full force above the critical force is experienced, it may not flow deeper within the material where less than the critical force is experienced.

Generally, a suspending agent may be considered as an aqueous medium, a solvent system, or any combination thereof, which can suspend the disclosed microparticulates and macroparticulates while the composition is impacted by incident forces or energy. Importantly, the suspending agent may maintain macroparticulates and microparticulates in suspension over extended periods of time, providing a long "shelf-life" for the composition and maintaining an originally-provided essentially uniform distribution of microparticulates and macroparticulates even as the fluid is subjected to external forces, including the force of gravity. The suspending agent may be prepared so that no external force will effect the integrity of the original distribution and proportion of elements therein, where an originally-provided uniformity remains consistent even under the imposition of an external force.

Known methods for creating a suspending agent 104 with the above properties are detailed below. To provide the above properties, the suspending agent 104 may comprise: an aqueous solution of acrylic acid polymer and hydrocarbon distillate containing ammonium hydroxide; water; and glycerin. Alternatively, the suspending agent may comprise an aqueous solution of acrylic acid polymer and hydrocarbon distillate containing ammonium hydroxide; and an emulsion of oil and water. The suspending agent may also comprise a natural viscofier, such as (one or more of) starch, cellulose, alginate, protein, or combinations thereof. The suspending agent may also comprise a synthetic viscofier, such as (one or more of) hydrophobically modified alkali swellable emulsion (HASE), acid-swelling associative thickener, or combinations thereof. The suspending agent may also comprise a fluid base comprising an aqueous solvent, a nonaqueous solvent, or combinations thereof.

The suspending agent may comprise, but is not limited to, hydrocarbons, such as alkanes, alkenes, arenes, halogenated hydrocarbons, mineral oils, silicone-based oils and greases, halogenoalkanes, alcohols, glycerols, esters, carboxylic acids, ketones, aldehydes, amines, acid chlorides, nitroarenes, nitriles, amides, fats, fatty acids, starches, polyols, glycols, propanolamines, polymers, hydroxides, and combinations thereof.

Accordingly, the suspending agent may comprise one or more of synthetic 1,2,3 trihydroxy propane; trihydric alcohol; trihydric glycerol; fat based glycerols; oil based glycerols; fatty acids; methyl fatty acids; hydrogenated starch hydrolysates; sorbitol; polyol; polymers; hydroxides; or combinations thereof. The suspending agent may be present at a wide range of possible concentrations. As non-limiting examples, the suspending agent may be present at a concentration ranging from about 20% to about 80% by weight of the total composition, such as, for example, at concentrations of suspending agent ranging from about 20% to 30%, 30% to 40%, 40% to 50%, 50% to 60%, 60% to 70%, 70% to 80% by weight of total composition, and continuous combinations thereof. The particular choice of suspending agents is not limited to those listed above, as other combinations and similar materials which provide the same properties will be recognizable to one skilled in the art.

The composition 102 also comprises ceramic microparticulates 116 dispersed within the suspending agent. These low-density microparticulates may be made of solid ceramic, or may comprise ceramic along with, or coated by, other materials. The ceramic may be made porous to decrease its density. The ceramic microparticulates 116 may be substantially spherical microparticulates ranging from approximately 10 micrometers to approximately 800 micrometers in diameter, although other sizes, shapes, and ranges may be optimal for increasing or decreasing various kinds of particulate-particulate interactions as set forth below. Even when the microparticulates are not spherical, they may have at least one axis which is essentially of the above dimension. These ranges may be adjusted in approximately 5 micrometer intervals (for example, 15 micrometers to 800 micrometers, or 10 micrometers to 795 micrometers). Some of these ranges include, but are not limited to approximately 10 to approximately 500 micrometers, approximately 10 to approximately 200 micrometers, approximately 10 to approximately 100 micrometers, approximately 70 micrometers to approximately 100 micrometers, approximately 100 to approximately 400 micrometers, approximately 100 to approximately 300 micrometers, approximately 200 to approximately 800 micrometers, approximately 400 to approximately 800 micrometers, approximately 500 to approximately 800 micrometers, and approximately 200 to approximately 600 micrometers.

One type of ceramic microparticulate which may be used is produced by SPHEREONE Incorporated of Chattanooga Tenn., and marketed under the trademark EXTENDO-SPHERES CG CERAMIC MICROPARTICULATES. These ceramic microparticulates contain up to approximately 5% crystalline silica, mullite and glass and are a non-combustible composition. Another type of ceramic microparticulate which may be used is marketed under the trademark 300/600. Ceramic microparticulates may be advantageous over pure glass microparticulates, as a non-limiting example, in situations where glass may shatter. Ceramic microparticulates may also be advantageous over metal microparticulates where weight, density, and manufacturing cost are an issue, although it is conceived that glass and/or metal microparticulates may be advantageous in some situations.

The composition 102 also comprises flexible-walled microparticulates 112 dispersed within the suspending agent. These low-density microparticulates may be made of plastic, rubber, combinations thereof, or any other material which provides a flexible-walled structure. The flexible-walled microparticulates 112 may be hollow, and/or may be filled with air, gas, liquid, semisolid, foam, or combinations thereof. The flexible-walled microparticulates may also be filled with any material which is optimized for sound-absorbing qualities, such as those described below. The flexible-walled microparticulates 112 may comprise substantially spherical microparticulates ranging from approximately 10 to approximately 800 micrometers in diameter, although other sizes, shapes and ranges may be optimal for increasing or decreasing various kinds of particulate-particulate interactions as set forth below. Even when the microparticulates are not spherical, they may have at least one axis which is essentially of the above dimension. These ranges may be adjusted in approximately 5 micrometer intervals (for example, 15 micrometers to 800 micrometers, or 10 micrometers to 795 micrometers). Some of these ranges include, but are not limited to approximately 10 to approximately 500 micrometers, approximately 10 to approximately 200 micrometers, approximately 10 to approximately 100 micrometers, approximately 70 to approximately 100 micrometers, approximately 100 to approximately 400 micrometers, approximately 100 to approximately 300 micrometers, approximately 200 to approximately 800 micrometers, approximately 400 to approximately 800 micrometers, approximately 500 to approximately 800 micrometers, and approximately 200 to approximately 600 micrometers.

It is believed that the surface area of the flexible-walled microparticulates 112 must be of sufficient amount to allow some deformation upon force loading and thus aid in the resiliency of the overall system, although this deformation may be minimal. One type of flexible-walled microparticulate which may be used is produced by Expancel Inc. of Duluth, Ga. under the model designation 091DE-80D30 acrylonitrile copolymer, and another type which may be used is a microparticulate formed of a SARAN-based polyvinylidene chloride (PVDC), although many other types of microparticulate may also be used.

In some embodiments, the flexible-walled microparticulates 112 exhibit a property of resiliency when in contact with the ceramic microparticulates 116. The flexible-walled microparticulates 112 may have active air space and, therefore, comprise the characteristic of compressibility. The flexible-walled microparticulates 112 may give a "ricochet effect." The ratio can be varied between ceramic microparticulates 116 and flexible-walled microparticulates 112 for a more compressible (flexible-walled) or a more rigid (ceramic) composition depending on the material's use.

The composition 102 also comprises celled macroparticulates 108 dispersed within the suspending agent. These celled macroparticulates comprise tiny pockets of air or gas, and present additional resilient internal surfaces by which incident forces and energy may be mitigated, and by which incident sound energy may be further absorbed. To provide such a cellular structure, a foamed polymer such as polystyrene may be used, although many celled structures in nature have been considered as usable in this application. The celled macroparticulates may also comprise one or more materials such as polystyrene, polyethylene, or polypropylene, and may be air-chambered particles or blown particles or other cellular-structured particles. The celled macroparticulates 108 may range from approximately 0.5 millimeters to approximately 8 millimeters in diameter although other sizes, shapes and ranges may be optimal for increasing or decreasing various kinds of particulate-particulate interactions as set forth below. Even when the macroparticulates are not spherical, they may have at least one axis which is essentially of the above dimension. These ranges may be adjusted in approximately 0.5 millimeter intervals (for example, 1 millimeters to 8 millimeters, or 0.5 millimeters to 7.5 millimeters). Some of these ranges include, but are not limited to approximately 0.5 millimeters to approximately 8 millimeters, approximately 0.5 millimeters to approximately 1 millimeter, approximately 1 millimeter to approximately 8 millimeters, approximately 1 millimeter to approximately 3 millimeters, approximately 2 millimeters to approximately 4 millimeters, and approximately 3 millimeters to approximately 8 millimeters. The celled macroparticulates may be any advantageous shape, and different shapes may be optimal for increasing or decreasing various kinds of particulate-particulate interactions as set forth below. Some classes of macroparticulates which have been found to be useful are available under the trade names EPERAN and KANEPEARL, as manufactured by the Kaneka Texas Corporation of Bayport, Tex.

In some embodiments it may be advantageous to include spherical hollow macroparticulates 110, without cells, ranging from approximately 0.5 millimeters to approximately 3 centimeters in diameter, although other sizes, shapes and ranges may be optimal for increasing or decreasing various kinds of particulate-particulate interactions as set forth below. Even when the hollow macroparticulates are not spherical, they may have at least one axis which is essentially of the above dimension. These ranges may be adjusted in approximately 0.5 millimeter intervals. Some of these ranges include, but are not limited to approximately 0.5 millimeters to approximately 2 centimeters, approximately 0.5 millimeters to approximately 1 centimeter, approximately 1 millimeter to approximately 3 centimeters, approximately 100 millimeter to approximately 1 centimeter, approximately 200 millimeters to approximately 2 centimeters, and approximately 1 centimeter to approximately 3 centimeters. These large hollow macroparticulates can serve to lower the density of the composition further, and can have additional energy-absorbing properties, particularly as discussed below with respect to sound energy.

In some embodiments, the ratio of the macroparticulates 108 to the microparticulates 112, 116 ranges from approximately 1:2 to approximately 1:2000, although other ranges may be optimal for increasing or decreasing various kinds of particulate-particulate interactions as set forth below. Some of these ranges include, but are not limited to approximately 1:2 to approximately 1:1500, approximately 1:2 to approximately 1:500, approximately 1:2 to approximately 1:50, approximately 1:5 to approximately 1:2000, approximately 1:5 to approximately 1:500, approximately 1:5 to approximately 1:100, approximately 1:10 to approximately 1:2000, approximately 1:10 to approximately 1:1000, and approximately 1:25 to approximately 1:100. The ratio can be varied between ceramic microparticulates 116, flexible-walled microparticulates 112, and cellular macroparticulates 108 depending on the material's use.

In some embodiments, the microparticulates 112, 116 and the macroparticulates 108 are suspended by the suspending agent in substantially fixed positions within the composition 102. As the suspending agent 104 reacts substantially as a solid when subjected to forces below a critical force, the microparticulates 112, 116 and the macroparticulates 108 are suspended stably in the suspending agent 104. However, even when the suspending agent 104 becomes substantially flowable (i.e., when it is subjected to forces above the critical force), the suspending agent 104 remains sufficiently viscous such that the microparticulates 112, 116 and the macroparticulates 108, while now free to contact each other in the manners discussed below, will still substantially avoid conglomeration or flocculation upon removal of the force.

Overall, the disclosed composition 102 is provided with a low density and a light weight, so as to be easily manufactured, transported, and installed. Lightweight, low density compositions are desirable because, as non-limiting examples, they may be installed with a minimal amount of support, may be added to existing constructions without the need for substantial redesign, may be worn on the body without the exertion of substantial additional energy, and may be easily carried from one location to another. The density of the composition 102 may be varied in a number of ways, depending on the desired properties of the composition. As non-limiting examples of ways in which the density may be lowered, the macroparticulates 108 may be made larger or increased in number, the flexible-walled microparticulates 112 may be made larger or hollow, lightweight ceramic microparticulates 116 may be used, the lowest effective proportion of suspend agent to particulates may be used, and the ratio of ceramic microparticulates 116 to flexible-walled microparticulates 112 may be reduced; even a small amount of ceramic microparticulates 116 relative to the number of flexible-walled microparticulates 112 may still improve the performance of the composition 102 relative to the use of ceramic microparticulates 116 or plastic microparticulates 112 alone. However, when selecting proportions of the constituent suspending agent 104 and particulates 108, 112, and 116, the particulates 108, 112, and 116 should be mixed to as to balance any attractive and repulsive forces between the particles, so that the ultimate particle dispersion will remain stable long after mixing is complete, and so as to avoid any aggregation or flocculation of the particulates 108, 112, 116.

Figure 2:
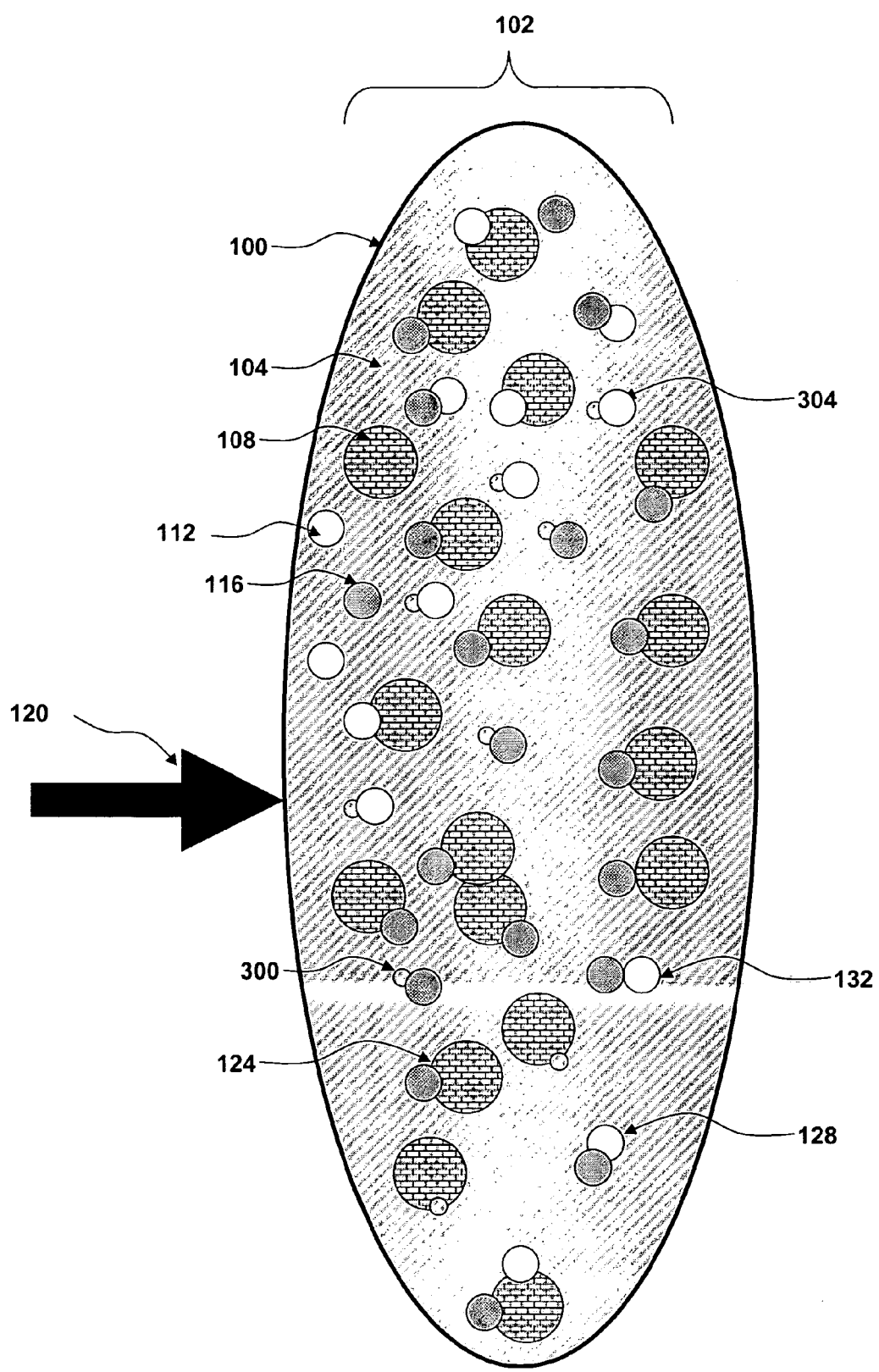
FIG. 2 is a diagram showing an absorbing property of the non-elastic incompressible composition of FIG. 1.

In some embodiments, the composition 102 is disposed in a container 100 which changes in shape in response to the incident force. For example, the container of FIG. 1 is shown in FIG. 2 with a shape which has responded to the incident force 120. In some embodiments, the composition 102 is disposed in a fluid-impervious container, which may or may not change in response to an incident force. In some embodiments, the composition 102 is disposed in a flexible-walled container, wherein one or more of the walls may flex to accommodate redistribution of the material under an external force. In some embodiments, the composition 102 is disposed in a container whose walls are bonded to a porous, foam, or aerogel blanket. Various sorts of synthetic, resinous, plastic materials such as PVC, polyurethane or polyethylene films or commonly used flexible acoustic barriers such as polyurethane or microcellular vinyl closed or open cell foams, with a fluid impervious coating on the side adjacent the fluid and/or an adhesive backing to enable attachment of the composition and its container to a structure, for example, may be employed. In addition, an outer layer of the container may be a foam material or aerogel material employed as a mat or blanket alone or bonded to a suitable exterior shell material. An elongated fiber mat, possibly composed of synthetic fibers, may also be used to surround a container.

Figure 16:
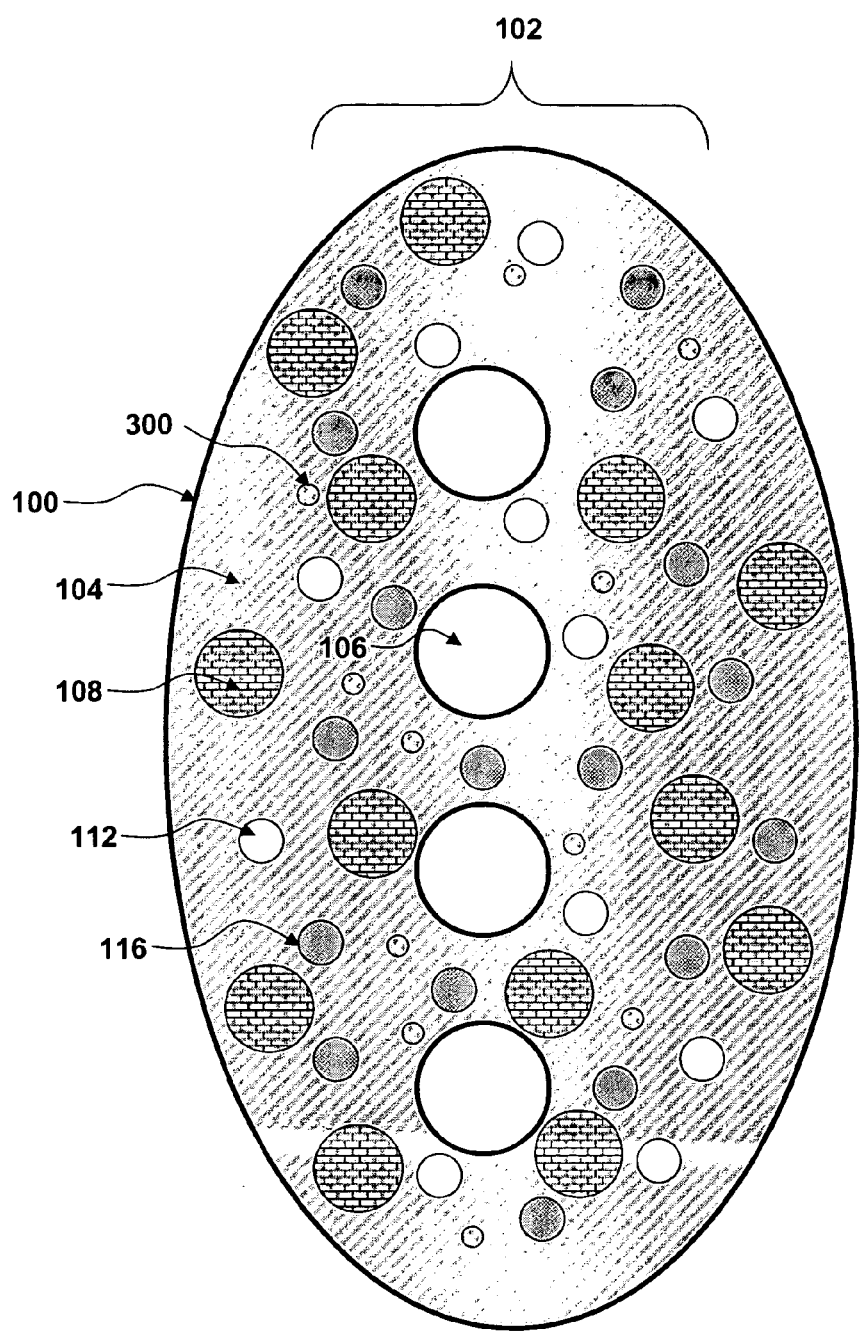
FIG. 16 is a diagram showing a composition disposed in a container provided with pass-throughs.

Many advantageous container shapes may be used. As shown in FIG. 16, some containers, while closed, may be advantageously provided with one or more pass-throughs 106, although these are optional, and are not shown in the other figures herein. Pass-throughs 106 allow air to circulate over more of the enclosed material, and improve heat dissipation. In this way, not only can heat energy from the composition 102 be dissipated more efficiently, but the weight of the container may also be reduced as less material is used in a container having the same larger external diameter. When in a container for use at a person or animal, these pass-throughs may be advantageously placed at those areas where direct contact with a user is not needed. Even if not complete pass-throughs, a similar principal may be used to provide areas with less material where contact is not essential, and areas with more material where contact is essential. The strategic placement of material within the shaped container can allow the composition to perform an energy-absorbing function while still maintaining a light weight.

It is important to note that, although the composition is shown extending to the walls of its container, in many instances it is advantageous to underfill the container 100. As a non-limiting example, a container 100 may be used such that only 40% to 80% of the extended volume of the container 100 may be filled with the composition 102, although no air or gas pocket should remain (that is, the container should be subjected to a vacuum before being sealed). In this manner, the composition 102 is given room to flatten or move within the container when subjected to an incident force, which can further help to distribute the incident energy across a wider area. Underfilling the container also helps to avoid an artificial rigidity of the composition 102 within the container 100. It should be noted that an air pocket should be avoided, as it too will add undesirable rigidity to the composition 102.

The composition 102 may also comprise an aerogel dispersed within the suspending agent. The aerogel comprises nanoparticulates 300. The term aerogel refers to the class of open-celled mesoporous solid materials, including but not limited to silica aerogels. In some embodiments, the nanoparticulates 300 comprise nanoparticulates 300 ranging from approximately 0.6 nanometers to approximately 800 nanometers in width, although other ranges may be used. Such ranges include, but are not limited to: approximately 10 nanometer to approximately 800 nanometers, approximately 100 nanometers to approximately 800 nanometers, approximately 20 nanometers to approximately 70 nanometers, approximately 50 nanometers to approximately 400 nanometers, approximately 20 nanometers to approximately 100 nanometers, approximately 25 nanometers to approximately 400 nanometers, and approximately 100 nanometers to approximately 400 nanometers. During preparation of the composition, an aerogel can be introduced into the suspending agent 104 at high shear, so that the walls of the aerogel structure may be broken and the aerogel may function to thicken the compound. Perlite, a naturally occurring siliceous rock, may be pulverized and used in place of these nanoparticulates where aerogels are unavailable, too expensive, or not advantageous. Expanded perlite may be used. The bulk density of the perlite is in the range of 2-25 lb/ft (to the third power). Perlite is inherently low density, has good acoustic and energy damping properties when used alone, and is also fire retardant. Also, sound damping fiber elements, although not shown, may be added to the mixture for additional sound damping and force mitigating capabilities.

Figure 3:
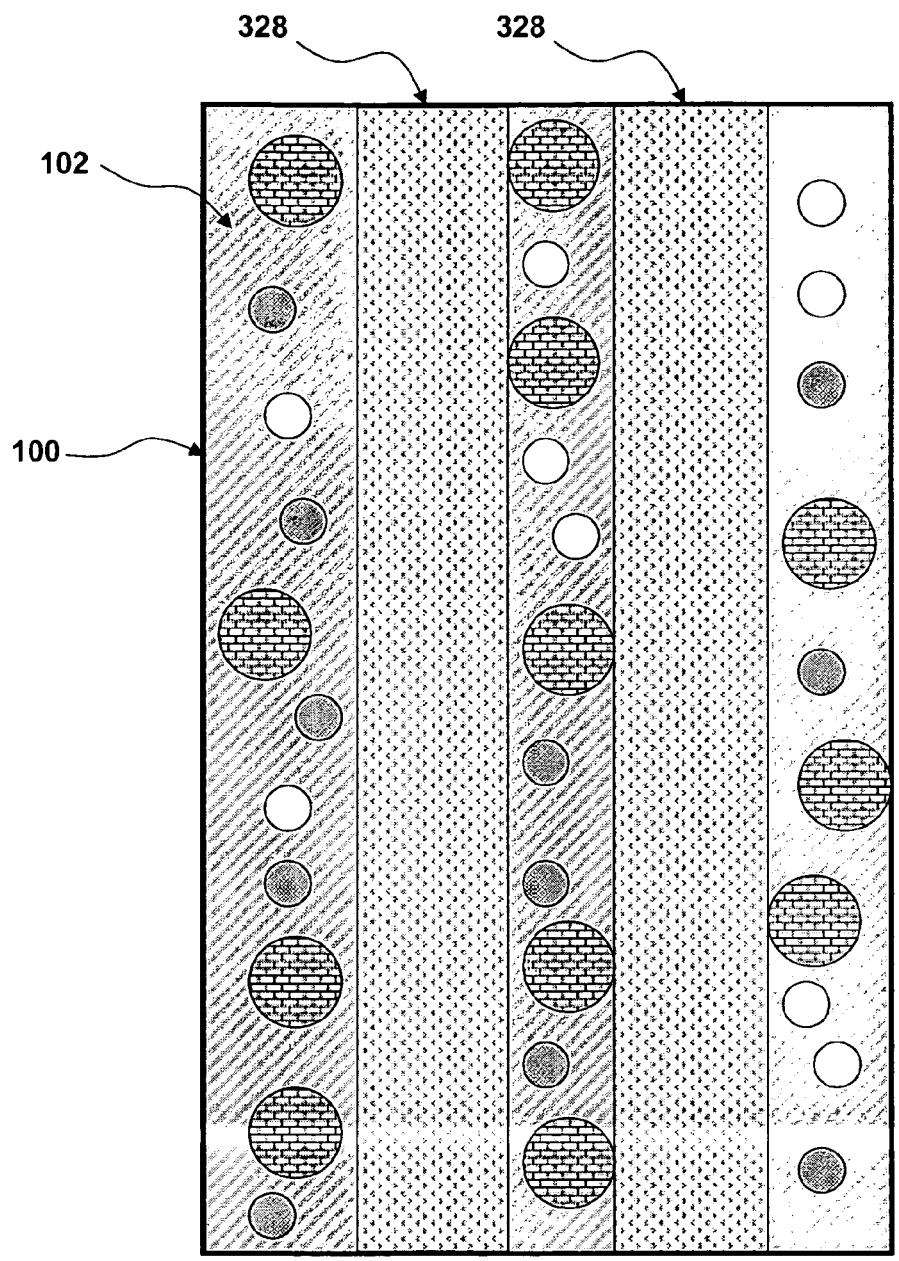
FIG. 3 is a diagram showing another embodiment of a substantially non-elastic incompressible composition comprising an aerogel layered with the suspending agent in a container.

As shown in FIG. 3, in some embodiments, the composition 102 further comprises an aerogel 328 layered with the suspending agent in a container 100. The aerogel comprises nanoparticulates 300. In some embodiments, the nanoparticulates 300 comprise nanoparticulates 300 ranging from approximately 0.6 nanometers to approximately 800 nanometers in width, although other ranges may be used. Such ranges include, but are not limited to: approximately 10 nanometer to approximately 800 nanometers, approximately 100 nanometers to approximately 800 nanometers, approximately 20 nanometers to approximately 70 nanometers, approximately 50 nanometers to approximately 400 nanometers, approximately 20 nanometers to approximately 100 nanometers, approximately 25 nanometers to approximately 400 nanometers, and approximately 100 nanometers to approximately 400 nanometers. During preparation of the composition, an aerogel can be introduced into the suspending agent 104 at high shear, so that the walls of the aero gel structure may be broken and the aerogel functions to thicken the compound. Perlite, a naturally occurring siliceous rock, may be pulverized and layered in place of these nanoparticulates where aerogels are unavailable, too expensive, or not advantageous. Expanded perlite may be used. The bulk density of the perlite is in the range of 2-25 lb/ft (to the third power). Perlite is inherently low density, has good acoustic and energy damping properties when used alone, and is also fire retardant. Also, sound damping fiber elements, although not shown, may be layered in the mixture for additional sound damping and force mitigating capabilities.

The above nanoparticulates, perlite particulates, and sound damping fiber elements have been found to bestow a number of improvements on the composition, including the following non-limiting examples: reducing the density of the composition; increasing the structural strength of the composition; improving the distribution of particles within the composition; absorbing energy within the composition; diffracting and refracting sound waves through the composition; adding fire retardency to the composition; and adding insulating properties to the composition.

Figure 4:
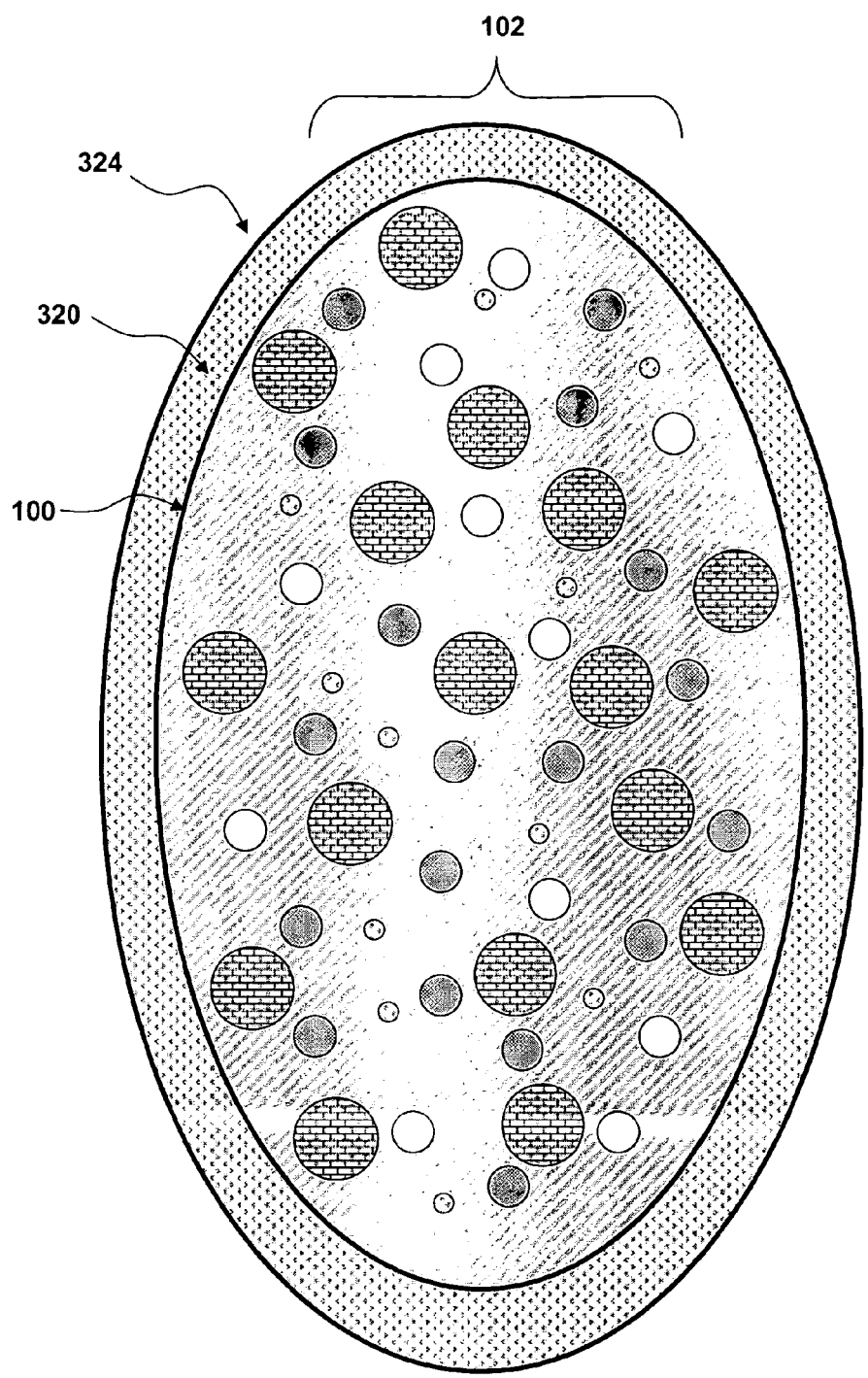
FIG. 4 is a diagram showing another embodiment of a substantially non-elastic incompressible composition disposed in a jacket comprising an aerogel.

As shown in FIG. 4, the composition 102 may be disposed in a jacket 324 comprising nanoparticulates of an aerogel 320. This jacket 324, which may also be referred to as a "blanket," may as a non-limiting example be a composite of silica aerogel and fibrous reinforcement, and potentially other additives, that turns the potentially brittle aerogel nanoparticulates into a durable, flexible material, with desirable mechanical and thermal properties. However, the jacket 324 may also, as a further non-limiting example, be a separate container mostly filled with suspended aerogel 320 nanoparticulates. The jacket 324 may be a separate structure until which a container is inserted, or it may be a layer of the container itself, such as the exterior or penultimate layer. As a non-limiting example, the container shown in FIG. 13 configured for use in a wall may be enhanced through the use of an aerogel 320 jacket 324 as the exterior or penultimate layer of the container 224.

Generally, it may be advantageous to make the composition 102, its container 104, or both fire-retardant by the selection of materials or by the inclusion of an appropriate material which will not support combustion. Generally, it may be advantageous to make the composition 102 effective over a wide temperature rage, including a range as large as approximately −30 degrees Fahrenheit to approximately 250 degrees Fahrenheit, and thus appropriate for use in desert or subarctic environments. Generally, it may be advantageous to include in the composition a preservative, to include an antimicrobial agent, and/or to utilize a suspending agent which itself has preservative or antimicrobial properties.

Generally, although not shown, the present composition 102 may also have advantageous uses as a coating for another material. In the examples disclosed herein, it is to be understood that a container containing only the disclosed composition 102 may be advantageous in some circumstances, while a container containing one or more other materials, surrounded by a layer of the presently disclosed composition 102, may itself be advantageous in the same or other circumstances.

Incident Force Absorption Applications

The composition 102 provides an incident energy absorbing property. Some mechanisms by which this incident energy absorbing property are provided will now be discussed. As illustrated in FIG. 2, the absorbing property provides absorption of energy from an incident force 120. Although shown as a compressive or pressure force, it is anticipated that the composition 102 may be configured by the shape or kind of container, or by the particular composition of elements, to respond to one or more kinds of forces, comprising shear forces, torsional forces, and even expansive forces. Additional modifications may be made when accounting for impact forces; as a non-limiting example, a container for use in a bullet-proof vest may have at its exterior an additional material which keeps the composition away from the surface of the body, allowing it to cushion in the event of an impact without passing that impact through to the user's body.

Upon receiving the incident force, a number of particulate-particulate interactions serve to disperse the incident energy and convert it into heat and other energy forms. Many of these particulate-particulate interactions are Brownian and stochastic, allowing for energy absorption to take place not only at the local area where the energy is incident, but also at additional locations throughout the material.

In one interaction, some of the microparticulates 112, 116 or macroparticulates 108 impact 124 others of the microparticulates 112, 116 or macroparticulates 108 to substantially absorb the incident energy. In addition, upon impact, the incident energy is dispersed in a direction askew from the direction of the incident force 120, effectively dispersing the incident force in multiple directions and reducing the pressure opposite the direction of the incident force 120. Particularly, the impact of the microparticulates 112, 116 with the macroparticulates 108 is effective in dispersing the incident force, as the cellular structure of the macroparticulate 108 tends to cushion and redistribute incident forces. Also, the impact of a particulate on a macroparticulate 108 may burst one or more of the cells within the celled macroparticulate 108, further cushioning and redistributing incident forces. In a major impact, any particle disclosed herein may burst upon impact with another particle or under direct application of the major impact force; as a non-limiting example, a major impact may cause one or more ceramic microparticulates 116 to shatter upon contact with each other, or upon contact with the source of the major impact force. This burst feature advantageously absorbs large amounts of incident energy, although potentially degrading the ability of the material to further absorb energy. Nevertheless, this burst feature allows the material to potentially be used in situations where a strong impact may be anticipated, and/or must be defended against.

In another interaction, some of the microparticulates 112, 116 or macroparticulates 108 deform 128 upon impact with others of the microparticulates 112, 116 or macroparticulates 108 to substantially absorb the incident energy. In this way, the microparticulates 112, 116, and in particular the flexible-walled microparticulates 112, deform to receive the impact of another microparticulate; by way of this deformation, some of the incident force is absorbed by the deforming material and partially converted into heat. In addition, the resiliency of the flexible-walled microparticulate 112 disperses the incident force in multiple directions.

In yet another interaction, the composition 102 may exhibit dilatancy above the critical force. Dilatancy may be construed as a state of having a viscosity which increases with the rate of an incident force. In the present example, the composition 102 provides a greater viscosity when impacted by a greater force 120, presuming said force is sufficient to allow the material to flow in the first place, as discussed above. One benefit of this dilatancy in absorbing energy is that increased viscosity may cause increased friction between particles 132. Accordingly, in some embodiments friction 132 between some of the microparticulates 112, 116 or macroparticulates 108 increases as the magnitude of the incident force increases. This friction is yet another way in which the material converts the incident energy into heat, thereby absorbing the energy.

In yet another interaction, the composition 102 may exhibit the particulate responses of oscillation, vibration, diffraction and refraction, described below in response to incident sound energy. These responses, however, are also advantageous in mitigating incident forces such as compressive forces, and provide additional energy absorbing characteristics to the composition when used in absorbing incident energy of any kind.

It should be noted that all of the above interactions may be enhanced or extended through interaction with the nanoparticulates 300, which can aid in the deformation of some of the microparticulates 112, 116 or macroparticulates 108, and which may be pulverized during impact, further cushioning and redistributing incident forces.

Figure 5:
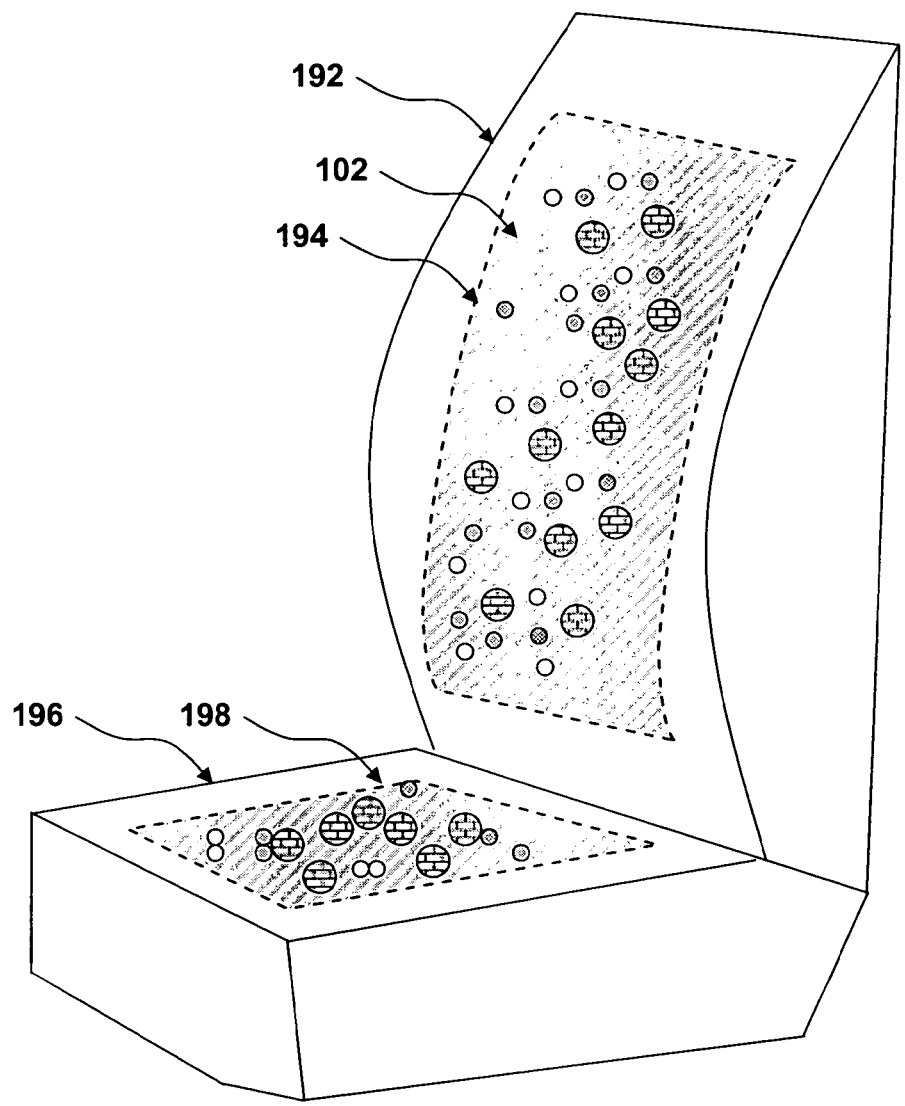
FIG. 5 is a diagram showing a composition disposed in a container for use with a seat and seat back.

As shown in FIG. 5, the composition 102 can be disposed in a container 198 configured for use as a seat 196 or seat cushion, or in a container configured for use as a seatback 192 or seatback cushion. The unique properties of the disclosed material for absorption and redistribution of forces can provide comfort for a seated user, especially one seated for extended periods of time. Such users can comprise, but are not limited to, vehicle operators such as car drivers, truck drivers, boat captains and pilots; those seated at a table, desk, conveyor line, or workstation; travelers on a bus, plane, or in a car; and those in a hospital or wheelchair who are confined or unable to move for extended periods of time. The disclosed material, by its novel distribution of forces, not only increases the user's comfort but also prevents tissue damage from prolonged pressure over one or more areas of the body.

Figure 6:
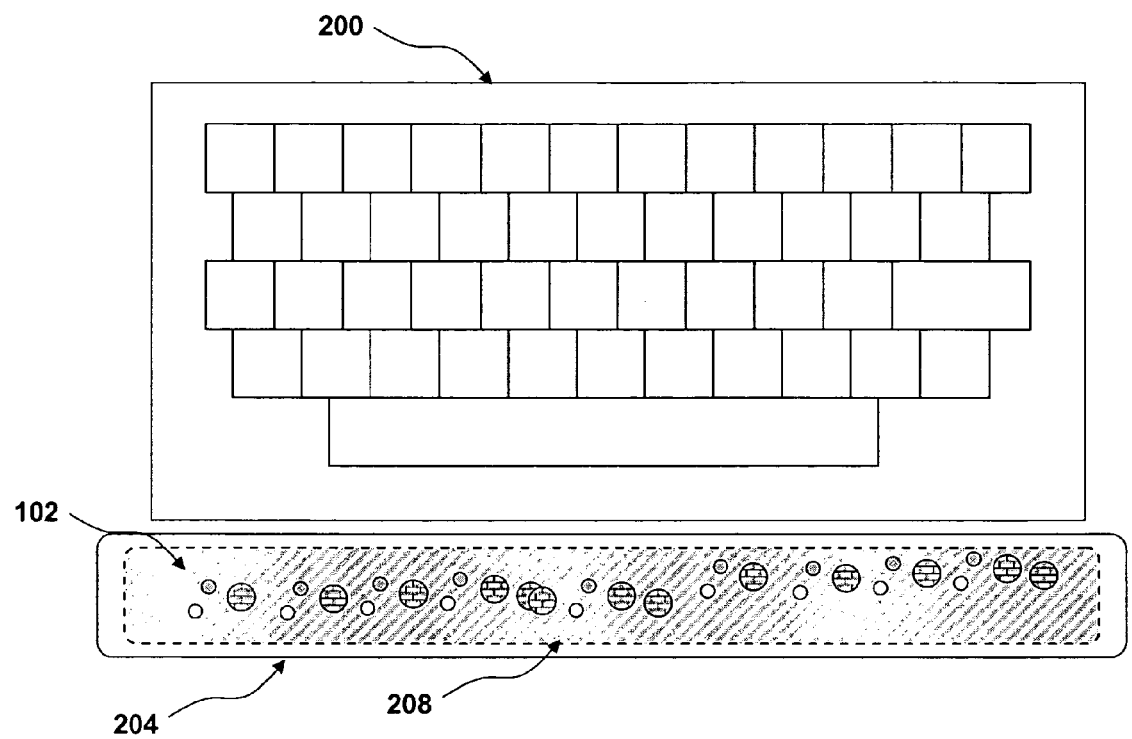
FIG. 6 is a diagram showing a composition disposed in a container configured for use as a palm rest.

As shown in FIG. 6, the composition 102 can be disposed in a container 208 configured for use as a palm rest 204 for a keyboard 200, mouse, or workstation, comprising such workstations as a surgeon's table, or a machinist's operation station. The unique properties of the disclosed material for absorption and redistribution of forces can provide comfort for the hands and palms of a user who is engaged in repeated motions such as typing, or in delicate motions such as surgery, especially one whose palms need to be supported for extended periods of time. Such users can comprise, but are not limited to, typists, computer operators, users of calculators, and those with hand or wrist injuries, especially those involving loss of tactile sensation or paralysis. The disclosed material, by its novel distribution of forces, not only increases the user's comfort but also prevents tissue damage from prolonged pressure over one area of the body.

Figure 7:
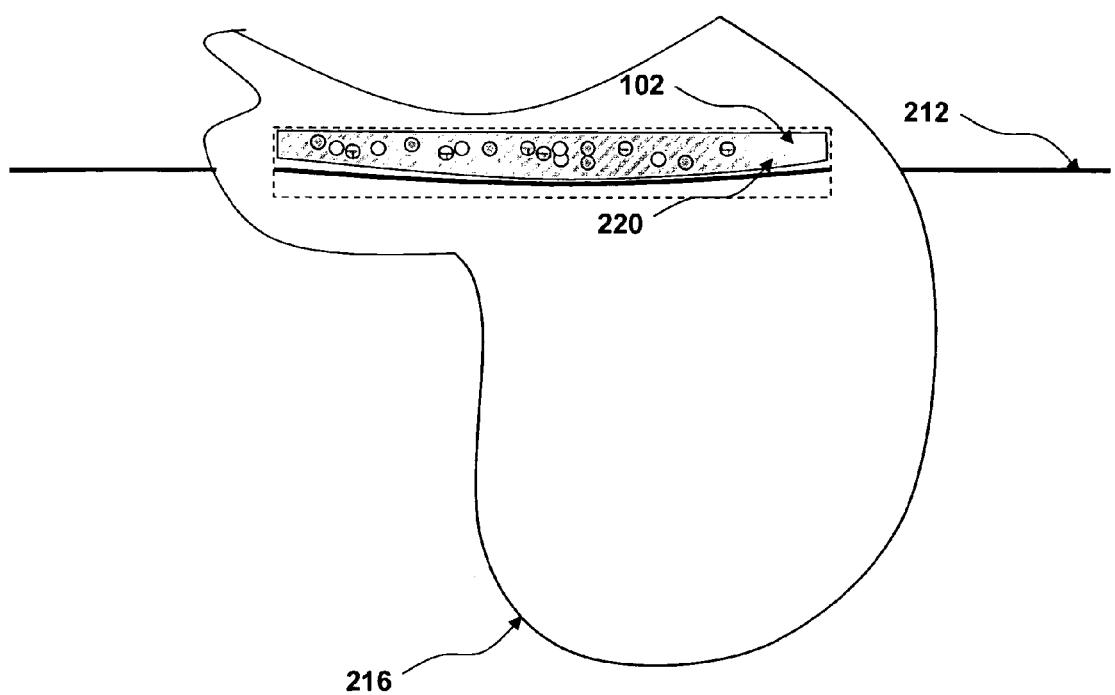
FIG. 7 is a diagram showing a composition disposed in a container configured for placement at, around, or under the body of an animal.

As shown in FIG. 7, the composition 102 can be disposed in a container 220 configured for placement at, around, or under the body of an animal. The composition may serve as an interface between an orthopedic device 216 and the soft tissue 212 of any member of the animal kingdom. In FIG. 7, a saddle, as an orthopedic device 216, has been placed on the back of a horse, as soft tissue 212. In cutaway, it can be seen that the underside of the saddle comprises a container 220 configured for placement on the horse's back 212. The container contains the above composition 102. The unique properties of the disclosed material for absorption and redistribution of forces can provide comfort for the animal, as well as for the human upon it. Other uses can comprise, but are not limited to: providing comfort for the rider of an animal and for the animal itself; providing comfort for a pack animal by redistributing forces due to the weight of the pack; and providing comfort to an animal who must be contained or restrained. The disclosed material, by its novel distribution of forces, not only increases the comfort or an animal or a human using an orthopedic device on the animal, but also prevents tissue damage to the animal from prolonged pressure over one area of the body.

Figure 17:
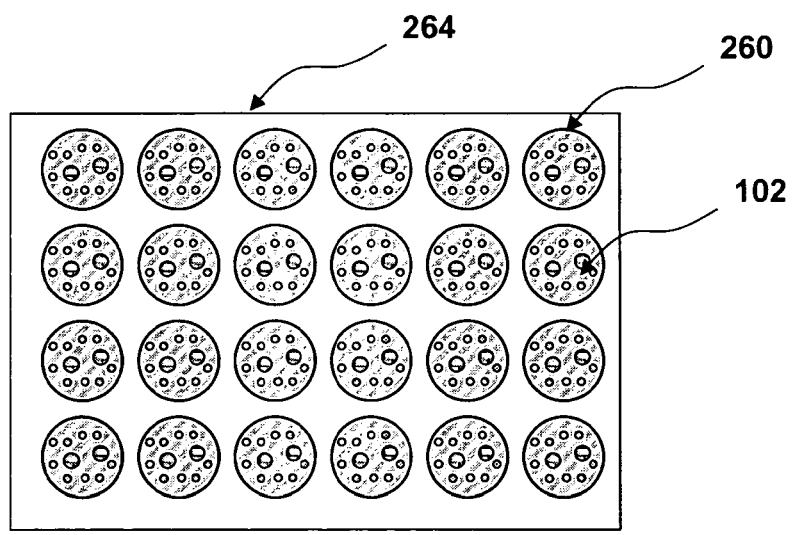
FIG. 17 is a diagram showing the composition disposed in a container in which a plurality of pockets are filled with the composition.

As shown in FIG. 17, the composition 102 can be disposed in a container 264 configured like "bubble-wrap," in which a plurality tiny pockets 260 are partially or completely filled with the composition 102. The container 264 may be provided as a sheet or on a roll, and a custom sized piece may be cut from the container 264 to provide the above composition in other areas. The sheet may optionally be perforated for easier removal of a custom-sized piece. The volume of the pockets 260, the size of the pockets 260, and the percentage of each pocket's expanded volume which is filled with the composition 102, may be varied. When underfilled, the composition 102 in each pocket may advantageously move within the pocket.

Because of its low density, the presently disclosed composition may also serve well as a flotation device, or as a hybrid seat cushion-flotation device. As non-limiting examples, the disclosed composition may be placed in a life preserver on a ship or which is worn on the body when engaging in a water sport. As a further non-limiting example, even when a life-preserver is not fully filled with the present composition, a rigid lightweight preserver may be coated with a layer of the current composition. Such a coating would serve to mitigate any trauma to the life preserver, which in turn mitigates the potential for a traumatic impact between the life preserver and the user, for example, when jumping from a ship while wearing the preserver. For example, a user who jumps from a ship in a rigid lightweight preserver may crack his jaw upon impact with the water; a coating of composition 102 can serve to greatly reduce that trauma without adding much weight to the preserver.

Because of its low density, the presently disclosed composition may also serve well as a trauma-mitigation device such as a protective vest or a sport protection device such as a helmet or shoulder pad. As non-limiting examples, the disclosed composition may be placed in a container configured for use in an article of clothing such as a vest, configured for use in protecting the wearer from the impact of a bullet. An incident bullet will provide sufficient force for the material to deform and for viscosity to increase, the material thus providing many internal particulate-particulate interactions to absorb the force of the bullet. As a further non-limiting example, the disclosed composition may be placed within a football helmet. An incident impact of another player will provide sufficient force for the material to deform and for viscosity to increase, the material thus providing many internal particulate-particulate interactions to absorb the force of the impact. As above, the material may also be used as a coating for another known impact mitigation material.

Although a limited number of examples of containers suitable for the present composition are disclosed above, one skilled in the art will recognize additional uses for the disclosed composition in absorbing incident energy, including but not limited to compressive forces and traumas. These containers are also deemed to be part of the disclosed invention.

Sound Absorption Applications

Particular attention should be given to the use of the above composition 102 in the use of absorbing sound energy. In experiments using the above composition 102, there was a perceptible reduction in sound transmission through the composition 102, which was perceptibly greater than that of materials with similar densities. In one experiment, sound was produced at a portable stereo at volumes in excess of than 70 dB, and was perceived through a two-inch piece of the composition 102 covering the ears of the perceiver. Sound dampening was perceived to be in excess of 75%, and was particularly effective at lower frequencies.

Accordingly, in some embodiments above, the incident energy comprises sound energy 136. The microparticulates 112, 116 and the macroparticulates 108 may convert some of the sound energy 136 into heat. The composition 102 can increase this conversion through diffraction 152 of the sound energy. The term diffraction may be construed to mean the bending of sound waves around objects, but may also be construed to mean the bending of sound waves by the motion of those objects themselves. A container 100 containing the composition 102 can provide a "barrier" or blocking function by serving as a boundary to airborne sound as well as an absorbing function as the sound waves penetrate the container and are dissipated as heat within the composition 104. The container may be rigid or flexible, and may have sufficient integrity so as not to be destroyed by mechanical action of outside forces. Various sorts of synthetic, resinous, plastic materials such as PVC, polyurethane or polyethylene films or commonly used flexible acoustic barriers such as polyurethane or microcellular vinyl closed or open cell foams with a fluid impervious coating on the side adjacent the fluid and/or an adhesive backing to enable attachment of the container to a structure, as non-limiting examples, may be employed. The sound waves are sufficiently trapped within the container 100 and the composition 102 and are diverted or scattered by diffraction off of the particulates therein until their eventual conversion into heat and other energy forms. The container 100 may provide a "barrier" or blocking function by serving as a boundary to airborne sound, as well as an absorbing function as sound waves penetrate the composition 102 and are dissipated as heat. The composition 102 also provides damping and isolation to minimize the effects of structure-borne vibration.

The composition is particularly suited to damping relatively low frequency, high-energy sound that may be of about 2 to about 2400 Hz, but significantly dampens sound also at frequencies from about 2 Hz to about 26,000 Hz and beyond. The composition 102 and its container 100 also provide damping and isolation to minimize the affects of structure-borne vibration.

As a non-limiting example, the particulates together may occupy 20% to 60% of the composition by weight, and/or may occupy 30% to 50% of the composition by weight, although other combinations and proportions may be used.

The combination of macroparticulates 108 and microparticulates 112, 116 and even nanoparticulates 300, can lead to a broad range of frequency absorption, and can act together within the suspending agent 104 to diffract, diffuse, and distribute sound waves, until the appropriate particulate can absorb them somewhere within the suspending agent 104. One advantage of the presently claimed composition 102 is that, by behaving at as a solid below a critical force, the composition 102 may be shaped to closely shield and dampen structural vibrations and impinging sound energy, and then indefinitely retain the provided shape essentially as a solid. Among the various reasons for the presently claimed composition's 102 ability to dampen sound energy: sound waves propagate through the low-density composition 102 at a much lower speed than in air, although reacting like a solid, there is little solid-phase vibration in the composition 102 owing to its structure, and impedance of the air-surface interface is lowered.

Generally, the composition may provide an economical and efficient means of absorbing airborne sounds. Generally, the composition may also dampen structural vibration. Generally, the composition may be particularly effective against low frequency, high-energy sound. Generally, the composition may be provided in one or more modular containers, facilitating custom installation of sound damping structures in various environments. Generally, the composition may be employed in a wide variety of end use environments.

As shown in FIG. 8, when sound energy 136 is incident on the composition 102, the microparticulates 112, 116, macroparticulates 108, and suspending agent 104 together serve to dissipate sound energy. As a non-limiting example, the microparticulates and macroparticulates may range from 10 micrometers to 3 centimeters as discussed above, and may be of generally spherical configuration with substantially smooth exterior surfaces, although other shapes may be used, and an irregular exterior surface may be advantageous for certain damping applications. Sound energy 136 in the form of longitudinal sound waves refract upon entering the composition 102, then dissipation begins, followed by random scattering as a result of diffraction of the waves as they encounter the microparticulates 112, 116 and macroparticulates 108. In particular, a number of particulate actions serve to disperse the sound energy and convert it into heat and other energy forms. Here, it is presumed that the sound energy does not provide a force greater than the above-mentioned critical force, so the composition 102 reacts substantially as a solid, and the particulates remain in substantially consistent locations in the composition 102. However, it is conceivable that sound energy, and in particular the vibration of a physical structure to which the composition 102 (and possibly container 100) are applied, may exceed the critical force needed to cause the material to slightly flow, thereby increasing particulate-particulate interaction at high sound energy. Regardless, sound energy incident on particulates can cause those particulates to oscillate slightly; the amount of oscillation may depend on the particulate material, the particulate structure (hollow, celled, or solid), the particulate shape, and the frequency of the incident sound energy. Overall, a composition 102 with a distribution of particulate types and sizes as disclosed here can advantageously turn incident sound energy into oscillation, and thus convert the energy into heat. Although not shown, air bubbles may be entrapped within the composition 102, and in particular may be entrapped within an emulsion suspending agent 104, which can further improve the composition's sound absorbing properties.

In some embodiments, the incident energy comprises sound energy 136, and the microparticulates 112, 116 and macroparticulates 108 convert some of the sound energy into motion 144 of the microparticulates 112, 116 and macroparticulates 108 within the suspending agent. Again, sound energy incident on particulates can cause those particulates to oscillate, where the amount of oscillation may depend on the particulate material, the particulate structure (hollow, celled, or solid), and the frequency of the incident sound energy. Overall, a composition 102 with a distribution of particulate types and sizes as disclosed here can advantageously turn incident sound energy into oscillation, and thus disperse the energy into the suspending agent 104 where it is eventually absorbed.

In some embodiments, some of the microparticulates 112, 116 are substantially hollow. The hollow particulates can provide advantageous resonances within the material. Hollow particulates may be filled with air, foam, or other gases. Additionally, larger hollow particles (up to even 3 cm in diameter) may be dispersed in the material, or nanoparticulates 300, optionally intercalated, may be disbursed in the material, to aid in its absorption properties.

As discussed above, aerogel nanoparticulates can be dispersed within the composition, or an aerogel blanket can be used, for additional sound absorption, to increase the viscosity of the composition, and/or to further deflect sound waves. It should be noted that the suspending agent 104 may be formed as an emulsion with air bubbles trapped therein, for additional sound absorption. If used at a location of high vibration, this vibration may provide enough of a shear force to turn the suspending agent essentially into a fluid, thereby loosening the particulates within and increasing sound damping behavior. If the suspending agent is an emulsion, such a high vibration may lead to an emulsion breakdown. However, it should be noted that the composition may in this case be "recycled," and sufficiently agitated so that the emulsion is recreated, and the material returned to its original structure and particulate distribution.

The macroparticulates 108, due to their size and cellular nature, may be particularly advantageous for reflecting 140 incident sound energy back into the suspending agent 104, where it disperses across the medium and is absorbed therein.

Although not shown, an outer layer of any container containing the composition 102 may be a foam material or aerogel material employed as a mat or blanket alone or bonded to a suitable exterior shell material. Here, the outer layer may be made substantially non-reflective to sound, so that a majority of incident sound waves will be passed into the material, and the incident energy absorbed therein.

Figure 9:
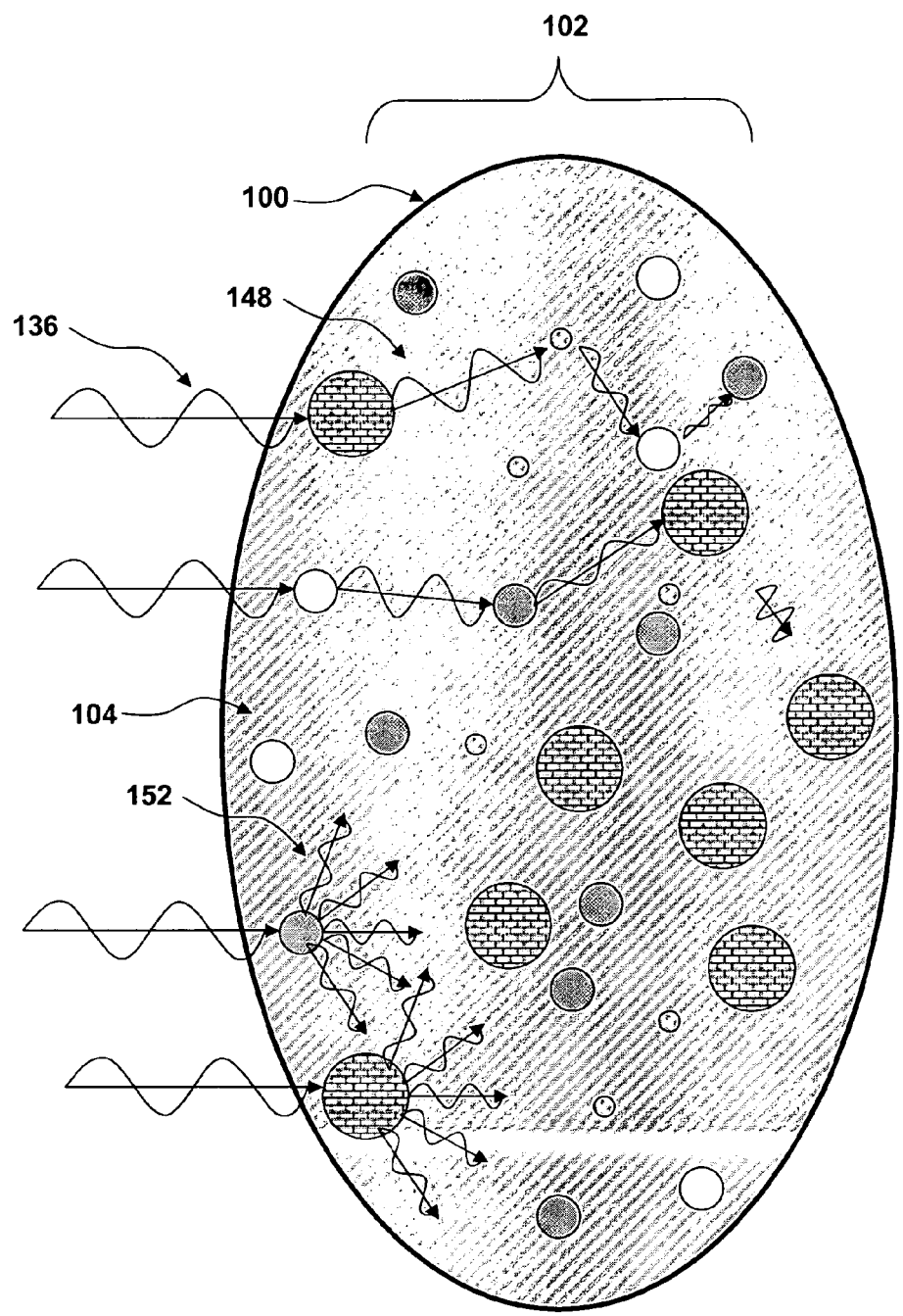
FIG. 9 is a diagram showing diffraction and refraction of sound energy through the composition.

As shown in FIG. 9, incident sound energy 136 on one side of the container may be refracted 148 within the composition before reaching the other side of the container. This refraction, caused not only by the density of the suspending agent 104 and composition 102 but also by the shape and placement of the particulates, can lead to an elongated travel path for a sound wave, diminishing the sound waves strength at each particulate impact and while traveling in the medium. Incident sound energy 136 may also be diffracted 152 within the composition, as the particulates impacted by the sound wave may oscillate in multiple directions within the medium and disperse sound energy therein.

Figure 10:
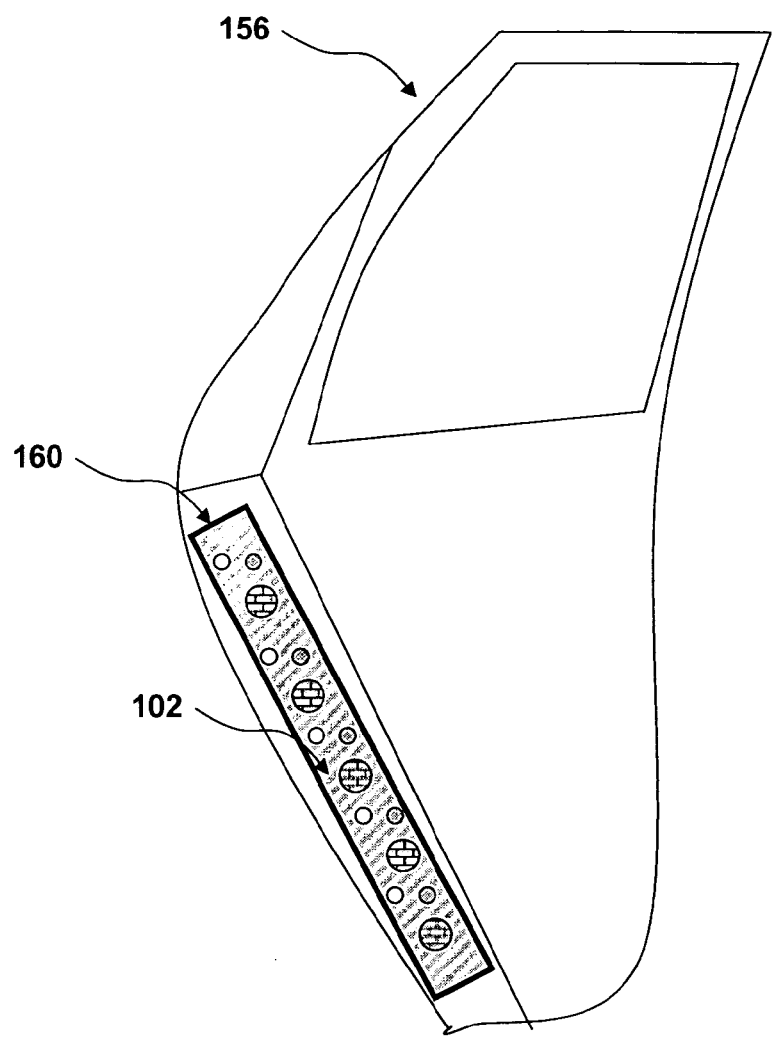
FIG. 10 is a diagram showing a composition disposed in a container configured for placement within the exterior of a vehicle.

As shown in FIG. 10, the composition 102 can be disposed in a container 160 configured for placement within the exterior of a vehicle 156. Although shown in a door, any structural chamber of the vehicle 156 may be used as or with a container 160 for the composition 102. The unique properties of the disclosed material for absorption and redistribution of sound energy can provide quiet for travelers in and operators of a vehicle. Such travelers and operators can include, but are not limited to, pilots, boat captains, car and truck drivers, train conductors, construction equipment operators, warehouse crew, and any other user of a vehicle. The disclosed material, by its novel distribution of sound energy, not only absorbs sound incident on the vehicle door but also helps to dampen sounds caused by vehicle vibration. In vehicles where the container 160 would be applied to a vehicle's outer shell, the composition 102 could be suitably encased to withstand the rigors of such an application.

Figure 11:
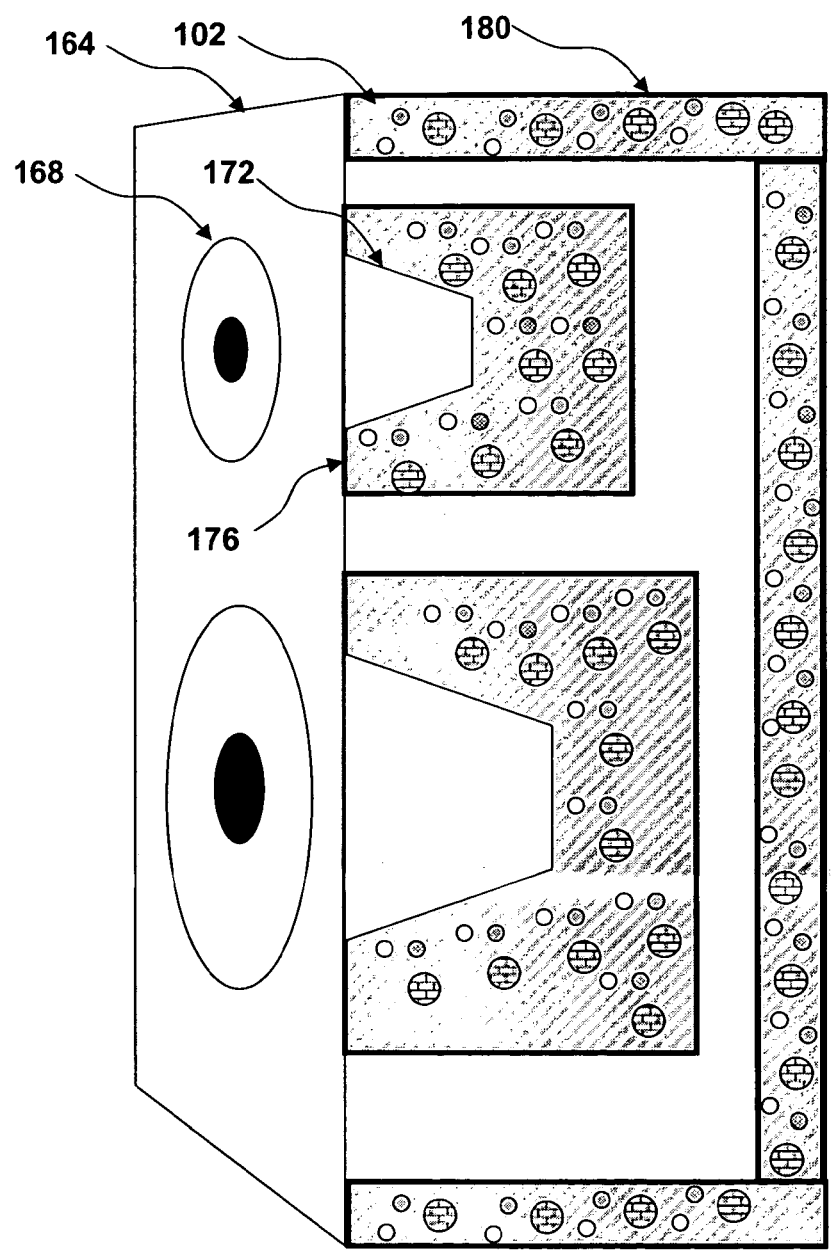
FIG. 11 is a diagram showing a composition disposed in a container configured for placement within a speaker housing.

As shown in FIG. 11, the composition 102 can be disposed in a container 176, 180 configured for placement within a speaker housing 164. The unique properties of the disclosed material for absorption and redistribution of sound energy can provide better direction for sound produced by a speaker. The disclosed material, by its novel distribution of sound energy, not only absorbs sound incident on the speaker housing from within, but also helps to dampen sounds caused by housing vibration. The material also dampens spurious resonances, i.e. "self noise," produced by other materials within a speaker housing. As shown, the container 176 can surround the driver and structural support 172 of a speaker 168 within the housing, thereby damping vibrations and absorbing sound exiting anywhere but from the front of the speaker 168. The speaker housing may be that of a mounted speaker, or of a free-standing speaker. Alternately, or in tandem, the container 180 can be placed along the interior wall of the speaker housing, or even along an exterior wall (not shown). Optionally, the container 160 could be shaped to completely fill the space within the speaker housing, having complete contact with the speakers 168 as well as the speaker housing's walls.

Figure 12:
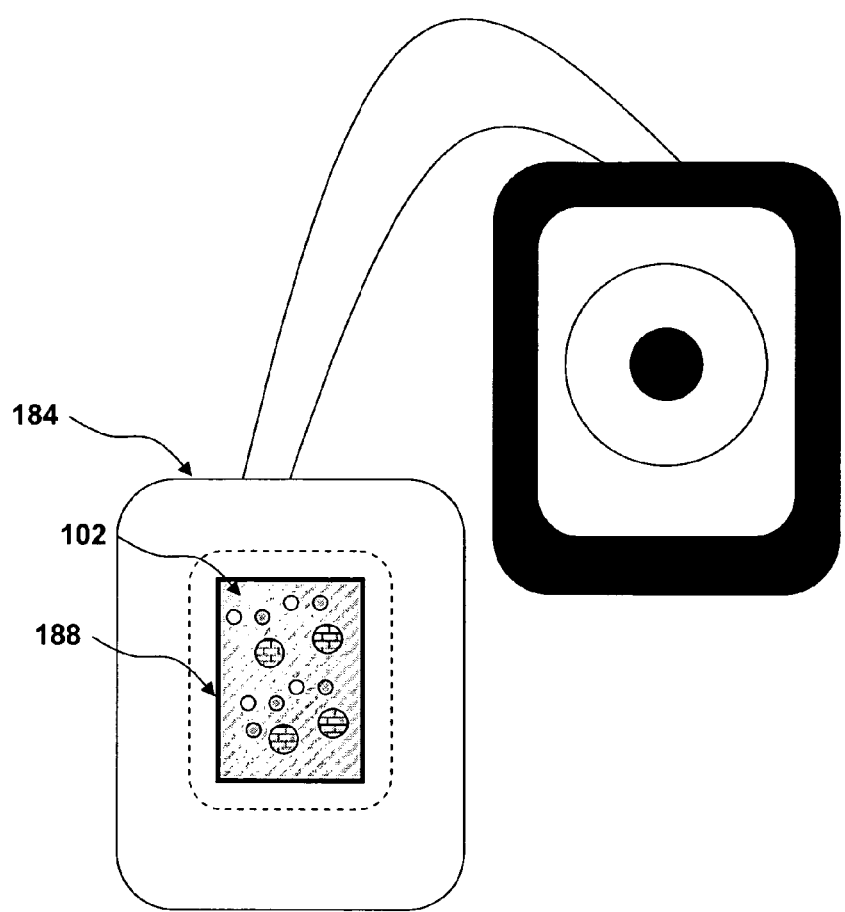
FIG. 12 is a diagram showing a composition disposed in a container configured for placement within headphones.

As shown in FIG. 12, the composition 102 can be disposed in a container 188 configured for placement within headphones 184. As shown, the container 188 surrounds the driver and structural support of a headphone speaker within headphone housing, thereby damping vibrations and absorbing sound exiting anywhere but from a chosen direction for the headphones. Although large headphones are shown here, the material may also be advantageous for use in low-profile headphones, including so-called earbuds. A similar structure to headphones 184 can be formed without any speakers, and with only earcups. This structure can serve as hearing protection, damping sound impinging on the ear from outside of the earcup.

Figure 13:
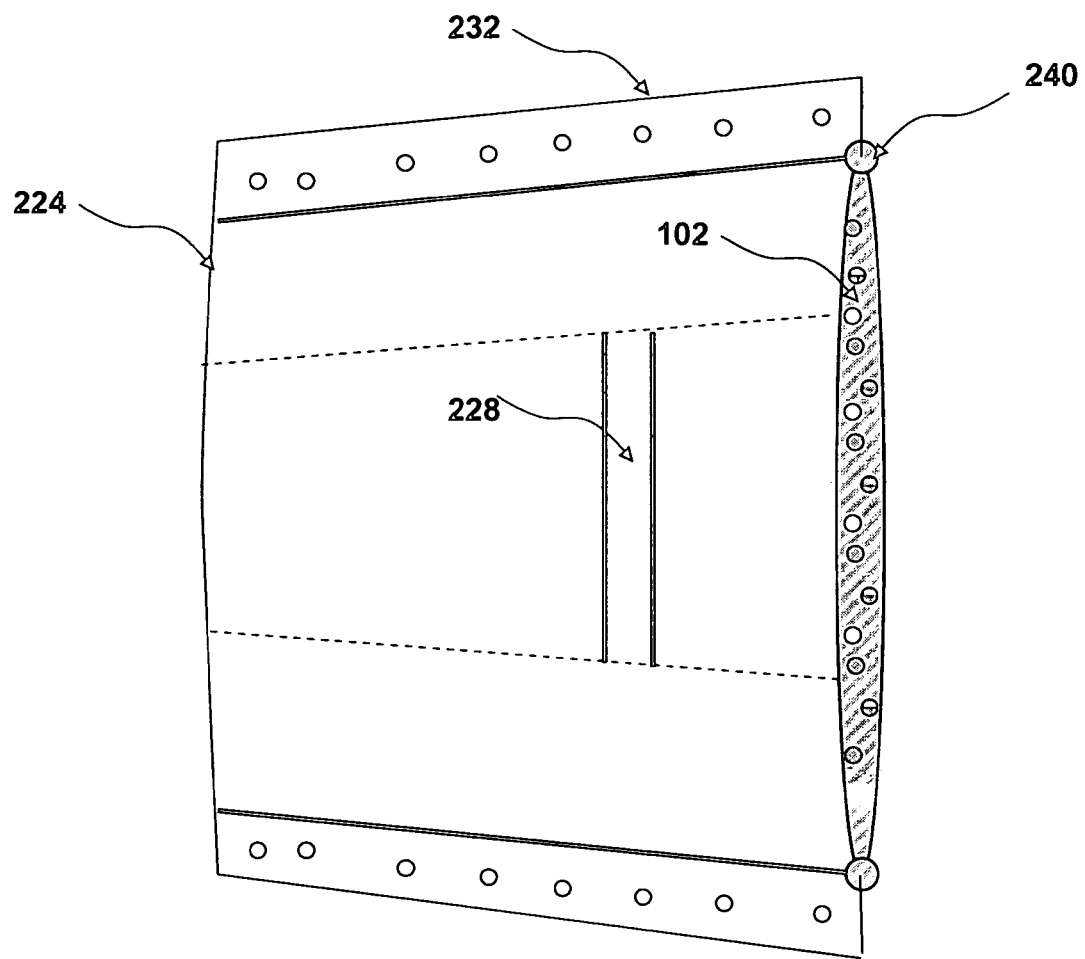
FIG. 13 is a diagram showing a composition disposed in a container configured for use at a building structure.

As shown in FIG. 13 the composition 102 can be disposed in a container 224 configured for use at a wall 232, roof, ceiling, floor, or door of a building. As shown, a closed container 224 comprising the above composition 102 is placed between a two-by-four 228 (shown in cutaway) and a wall 232. Additional overlaying barriers can be used. The containers may be secured in any desired relationship in any desired number depending upon the nature of the space and the degree of sound damping to be provided. However, to lessen undesirable resonance from any solid, adjacent structure such as wall studs, it is preferable that at least a portion of the container overlap any solid structures adjacent the space housing the container. Although just shown here as a wall, the same principles apply for absorbing sound at a ceiling, floor, or door of a building, where the composition 102 can be disposed in a container 224 within or at the exterior of the door, roof, or ceiling. As a further, non-limiting, example, the composition 102 may be disposed in a closed container placed between two two-by-fours or other beams within a structure, or as an overlying or underlying container to a structural wall. As a further, non-limiting, example, a stud may be contained within the interior of a wall, and a container containing the present composition may be placed in front of the stud, with a layer of a sound damping foam material (such as foam polyurethane or other suitable material such as an Aerogel blanket) placed on one side of the container, and a suitable wallboard placed on the other side of the container. This combination of material provides for effective sound damping and conversion of the sound energy into heat. U.S. Provisional Application No. 60/754,945, incorporated herein by reference in its entirety, discloses additional structures for use at a wall, ceiling, roof, floor, or door in performing sound absorption with the disclosed composition 102.

Figure 14:
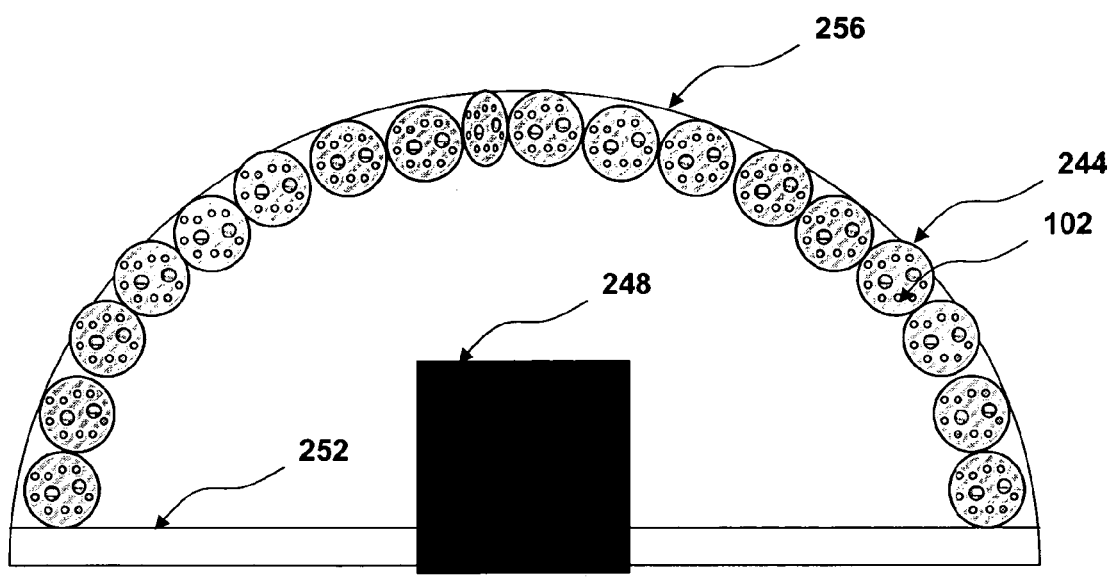
FIG. 14 is a diagram showing a composition disposed in a container configured for use in a submarine engine room.

As shown in FIG. 14, the composition 102 can be disposed in a container 244 configured for use in a submarine engine room 256. As shown, one or more containers 224 surround the an engine room 256 of a submarine engine 248, thereby damping vibrations and absorbing sound exiting the engine 248, both to prevent the escape of sound and to absorb incoming sonar so as to screen the engine room from sonar detection. A single container may be used across the entire area to be shielded, or a plurality of contiguously arranged flexible containers may be used. The composition may also be used on the exterior hull of the submarine with a sturdy, waterproof shell, not shown here.

Although a limited number of examples of containers suitable for the present composition are disclosed above, one skilled in the art will recognize additional uses for the disclosed composition in absorbing incident sound energy and vibrations. These containers are also deemed to be part of the disclosed invention.

Methods of Manufacture

The following are two non-limiting examples of methods for manufacturing the disclosed composition. Other methods may be used, and may provide different desirable thixotropic properties.

Glycerin/Water Mixture

An embodiment using the glycerin/water mixture within the suspending agent can be prepared as follows: Use about 60-80 parts by weight of glycerin to 20-40 parts by weight of water. In a suitable blender such as one with sigma blades and an extruder, mix 34.88 kg glycerin with 10.91 kg water at high shear. Next, an aqueous solution of acrylic acid polymer and hydrocarbon distillate containing ammonium hydroxide (available from the Rohn and Haas corporation) is added in an amount of 3.33 kg, under low shear mixing. Then, 2.85 kg foamed polymer beads are mixed in at extremely low shear, being careful not to damage the foamed polymer beads. Then, 14.26 kg of ceramic microparticulates and 14.26 kg of flexible-walled microparticulates are added while mixing is continued at extremely low shear, again being careful not to damage the foamed polymer beads. Between about 0.1%-3% by weight of a preservative can also be added. Between about 1% to 2% by weight of aerogel nanoparticulates can also be added at extremely low shear.

During mixing, attention must be paid to balancing the attractive and repulsive forces between the particles, so that the ultimate particle dispersion will remain stable long after mixing, and to avoid any aggregation or flocculation of the particulates.

Emulsion

Oil and water, or any other suitable emulsion constituents, are combined with a surface active agent such as structure-plus, under intermittent agitation in a suitable blender such as one containing sigma blades and an extruder, to form an emulsion. Then, the mixture is thickened to the desired viscosity and force-response properties with a suitable thickening agent such as 0.4 to 0.5 volume % of an aqueous solution of acrylic acid polymer and hydrocarbon distillate containing ammonium hydroxide (available from the Rohn and Haas Corporation). This mixture is dispersed well at low shear and then degassed if necessary.

At this point, foam bead macroparticulates, ceramic microparticulates, and flexible-walled microparticulates are added at extremely low shear. The above particulates are added in a ratio, by weight, of about 1:4:2. Between about 1% to 2% by weight of aerogel nanoparticulates can also be added at extremely low shear. The entire mixture is then blended smooth at very low shear and at very low speed. When completed, the density of the composition may range from about 1 to 4.5 pounds per gallon depending upon the ratio of macroparticulates to microparticulates to suspending agent.

Figure 15:
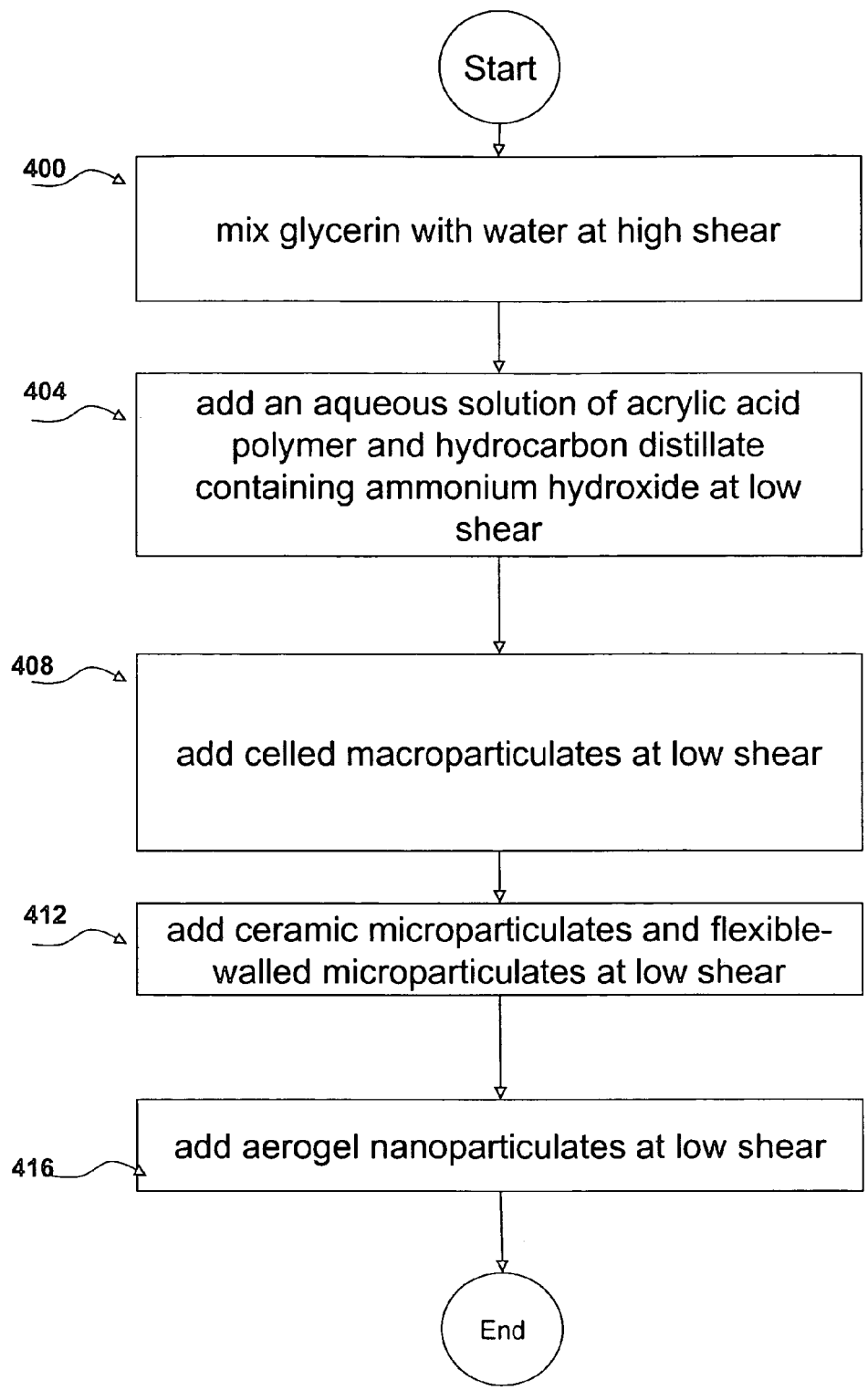
FIG. 15 charts a method of manufacturing a substantially non-elastic incompressible composition.

As charted in FIG. 15, the present inventive subject matter relates to a non-limiting example of a method of manufacturing a substantially non-elastic incompressible composition which substantially does not quickly self-level under standard operating conditions. First, glycerin is mixed with water at high shear (step 400). Then, an aqueous solution of acrylic acid polymer and hydrocarbon distillate containing ammonium hydroxide is added at low shear (step 404). Then, celled macroparticulates are added while mixing at low shear (step 408). Then, ceramic microparticulates and flexible-walled microparticulates are added while mixing at low shear (step 412). Optionally, nanoparticulates may be added at low shear (step 416). One or more of the mixing steps may be performed at extremely low shear, and low shear may be critical to avoid degradation of the particulates. This is only one order of steps by which the presently claimed composition can be made. Other orders of steps may be performed; for example, it may sometimes be advantageous to mix one or more of the particulates with the glycerin, at high or at low shear, before mixing in the water. The use of high or low shear depends on the physical properties of the interim composition, and also on the fragility of the particulates used.

The present inventive subject matter also relates to a substantially non-elastic incompressible composition which substantially does not quickly self-level under standard operating conditions, the composition formed according to the above method.

The present inventive subject matter also relates to a system for manufacturing a substantially non-elastic incompressible composition which substantially does not quickly self-level under standard operating conditions. The system includes: means for mixing water with glycerin at high shear;

means for mixing an aqueous solution of acrylic acid polymer and hydrocarbon distillate containing ammonium hydroxide with the water and the glycerin at low shear; means for dispersing foamed polymer particulates in the water and in the glycerin at low shear; and means for dispersing ceramic microparticulates and flexible-walled microparticulates in the water and in the glycerin at low shear.

Another aspect of the present disclosure comprises energy, impact, and/or sound absorbing compositions comprising a suspending agent and a fibrous material. The compositions, which are suitable for use as a padding and trauma mitigating formulation, may be characterized as a substantially non-elastic, incompressible composition, which substantially does not quickly self-level under standard operating conditions. The suspending agent may be one which reacts substantially as a solid when subjected to forces below a critical force, and which becomes substantially flowable when subjected to forces above the critical force. Incident energy may be diverted within the composition including displacement of the suspending agent. The fibrous material may comprise elastic fibers which stabilize the composition and slow down its movement during displacement while preventing bottoming out when an external force is imposed.

The fibrous-containing composition may comprise any of the previously disclosed suspending agents, including Bingham Fluids generally, e.g., Bingham Plastics, Caisson Fluids, and pseudosolids. The suspending agent may also comprise a heat transfer fluid, such as Duratherm S.

Figure 18:
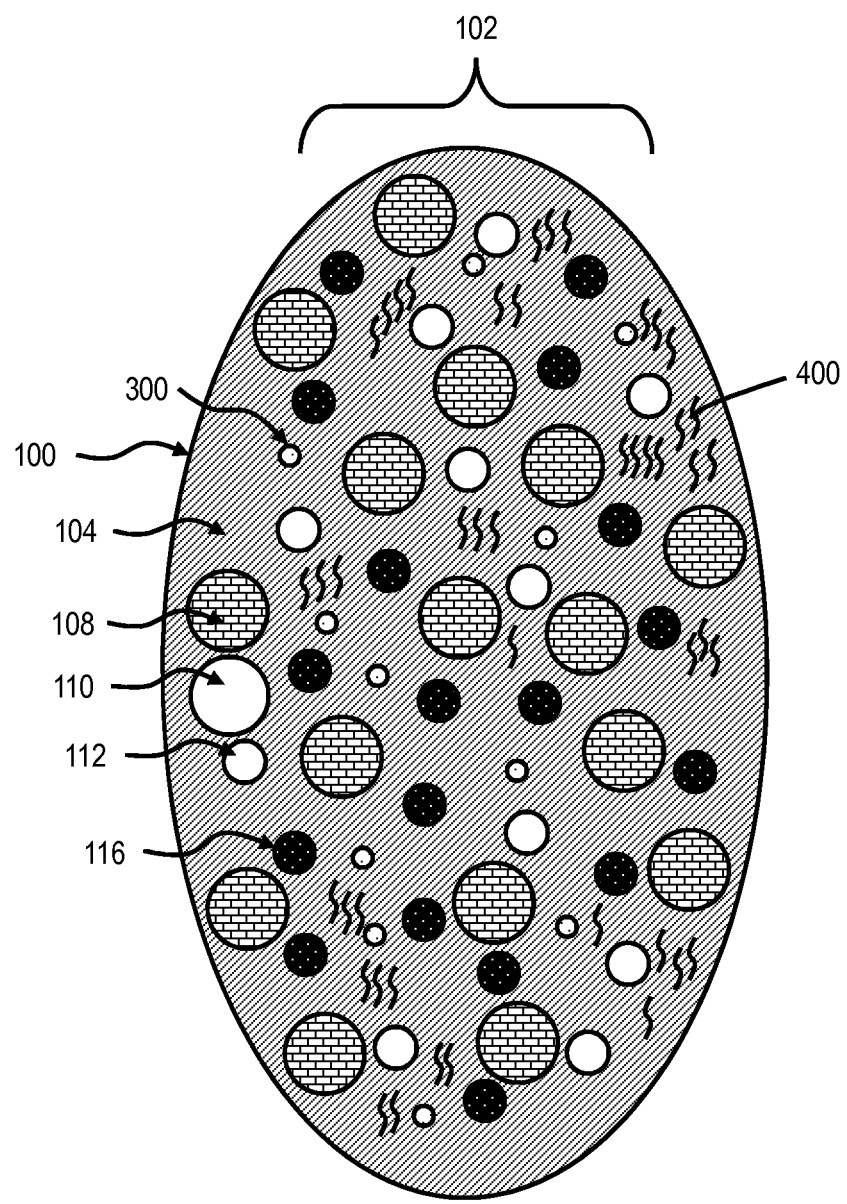
FIG. 18 illustrates a composition similar to that illustrated in FIG. 1 but containing fibers according to another aspect of the present disclosure.

The fibrous-containing compositions may comprise one or more of the particulate materials previously disclosed. For example, fibrous-containing composition may comprise any of the previously disclosed ceramic microparticulates, flexible-walled microparticulates, or celled macroparticulates, or any combination thereof, dispersed within the suspending agent. The fibrous-containing composition may also comprise an aerogel, as previously disclosed. The fibrous-containing compositions and applications thereof may comprise any of those illustrated in FIGS. 1 through 17 herein. For example, adverting to FIG. 18, a fibrous-containing composition may include the substantially non-elastic composition illustrated in FIG. 1 additionally containing fibers 400.

Fibrous material included in the compositions may have a diameter in the range of about 0.1 nm to about 2 mm, such as about 0.6 nm to about 1 nm, e.g., about 0.6 mm to about 0.5 mm, a length, prior to cutting and use, of about 0.5 inch to about 48 inches, such as about 1 inch to about 30 inches, e.g., about 3 inches to about 20 inches, and a length after cutting for use and mat formation, of about 0.25 inch to about 1 foot, such as about 0.5 inch to about 2 inches, e.g., 0.5 inch to about 1.5 inches. The fibers may be incorporated as individual fibers or integrated together, as in a mat. The mat may have a thickness of about 0.25 inch to about 6 inches, such as about 0.5 inch to about 4 inches, e.g., about 1 inch to about 3 inches.

Fibrous material suitable for inclusion in fibrous-containing compositions include any synthetic and/or natural fibers. Suitable synthetic fibers include silicone fibers. An example of suitable silicone fibers include the aerated silicone fibers disclosed in U.S. Patent Application Publication Nos. 2007/0003759 A1 and 2011/0076920 A1, the entire disclosures of which are hereby incorporated herein by reference. Such silicone fibers may comprise a first silicone rubber containing dimethylsiloxane or methylvinylsiloxane and a second silicone rubber containing dimethylsiloxane or methylhydrogensiloxane.

Other synthetic fibers suitable for inclusion in the compositions include synthetic polymers, such as nylon, styrene-butadiene, polyvinyl acetate, acrylonitrile butadiene styrene, acrylic). Suitable synthetic fibers may also include long- and nano-fibered polyester such as those produced by Toray Industries.

Natural fibers suitable for inclusion in the compositions include latex from latitciferous systems or other plant systems from a group including vegetable fibers are abaca, cotton, flax and hemp, although sisal, jute, kenaf, bamboo, ramie and coconut. Suitable natural fibers may also include fibers from animals such as silk, sinew, wool, catgut, angora, mohair and alpaca.

Fibrous-containing compositions may be included in containers, such as envelopes, and configured for various energy absorbing applications, including trauma mitigating applications. Fibers may also be contained within the container or envelope itself. Fibrous-containing compositions may be included in a container configured for any of the previously disclosed applications, including cover body padding for sports, military, police; knee padding for workers and gardeners; saddle pads for horses; muzzle pads for dogs; and padding for dog handlers.

Figure 19:
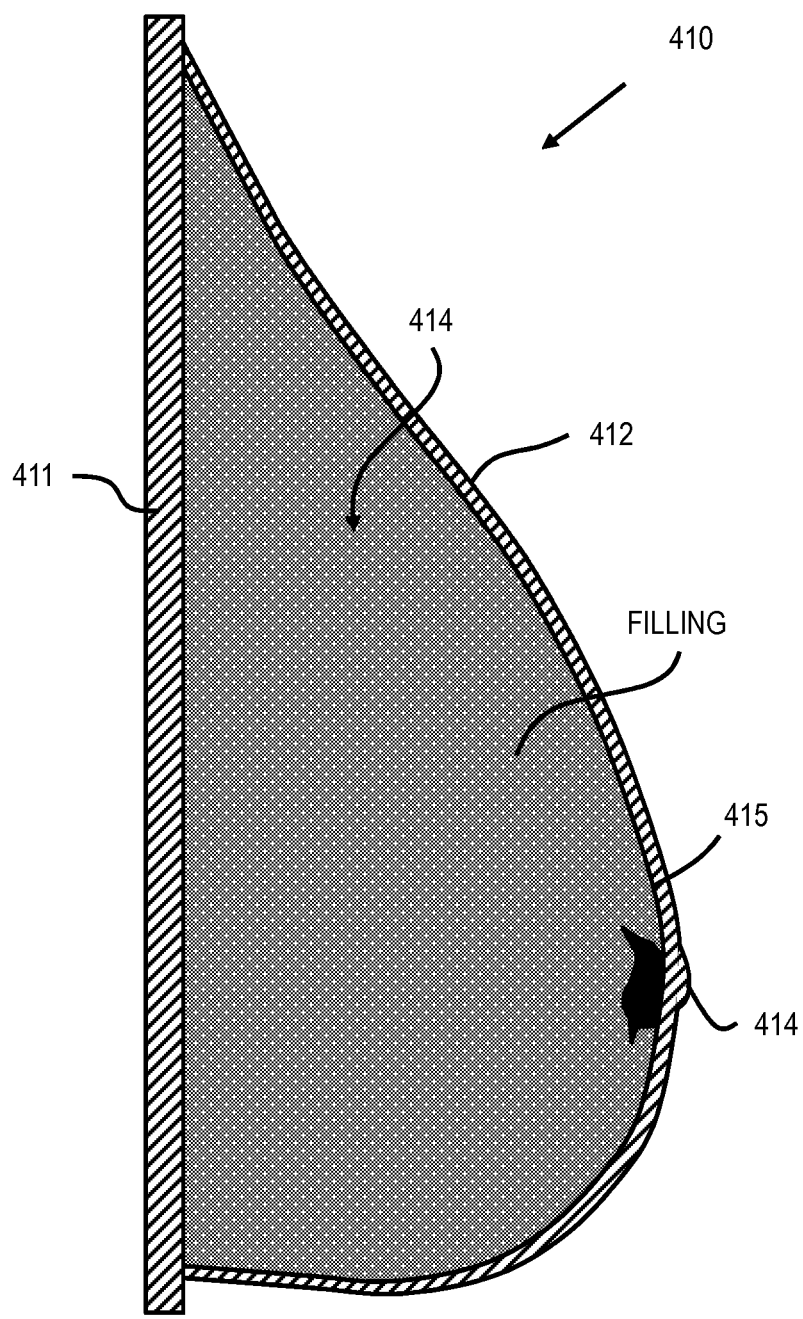
FIG. 19 is a cross-sectional view of an external breast prosthesis in accordance with another aspect of the present disclosure.

Fibrous-containing compositions may also be accommodated in suitable housings or envelopes configured for use in mastectomy garments, such as those disclosed in U.S. Patent Application Publication No. 2011/0076920 A1, and U.S. Pat. No. 6,234,867 B1 and U.S. Pat. No. 7,766,963 B2, the entire disclosures of which are hereby incorporated herein by reference. Fibrous-containing compositions may also be accommodated in suitable housings or envelopes configured for use in undergarments, such as brassieres, or garments or articles configured to support or protect the soft tissues of the body of a member of the animal kingdom, such as the epithelial, dermis, fascia, fibrous tissue, adipose tissue, connective tissue, tendons, blood vessels, and nerves. For example, a cross-sectional view of an external breast prosthesis 410 is illustrated in FIG. 19 and comprises base or rear skin 411, front skin 412, filling 413 comprising a fibrous-containing composition as disclosed herein occupying inner cavity 414, and nipple 414, which may comprise an extension of skin 412. An optional area 415 may be provided to simulate an areola and appropriately darkened. Suitable materials for the skins 411 and 412, nipple, and optional areola 415, as well as fabrication techniques are disclosed in U.S. Pat. No. 7,766,963 B2, the entire disclosure of which are hereby incorporated herein by reference.

The fibrous-containing compositions may be prepared by any of the techniques previously disclosed for preparing energy, impact, and/or sound absorbing compositions comprising a suspending agent and ceramic microparticulates, flexible-walled microparticulates, or celled macroparticulates, or any combination thereof, dispersed within the suspending agent. Fibrous-containing compositions containing a fibrous matt may be prepared by placing the matt upon an elastomeric film in the size and shape of the finished padding product. The suspending agent, e/g/. a Bingham fluid, is spread over the matt in a fashion similar to that used to frost cupcakes. A mechanical arm repeatedly pushes the fluid into the matt until the matt is entirely disposed within the fluid. A second piece of film is placed over the integrated composition and a vacuum is pulled followed by final sealing. A roller is imposed upon the closed package to further insure integration of the suspending agent with the matting.

Figure 20:
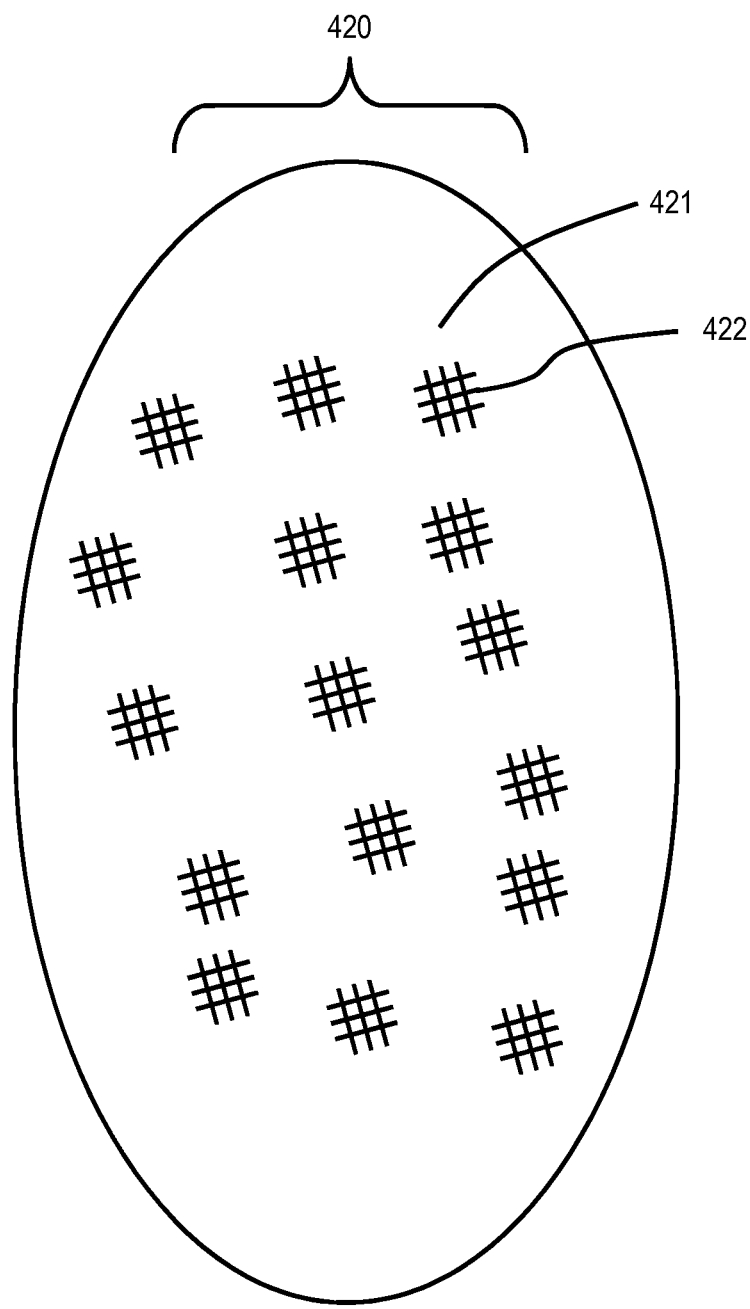
FIG. 20 illustrates a composition comprising a plurality of intermingled fibers in accordance with another aspect of the present disclosure.
Figure 21:
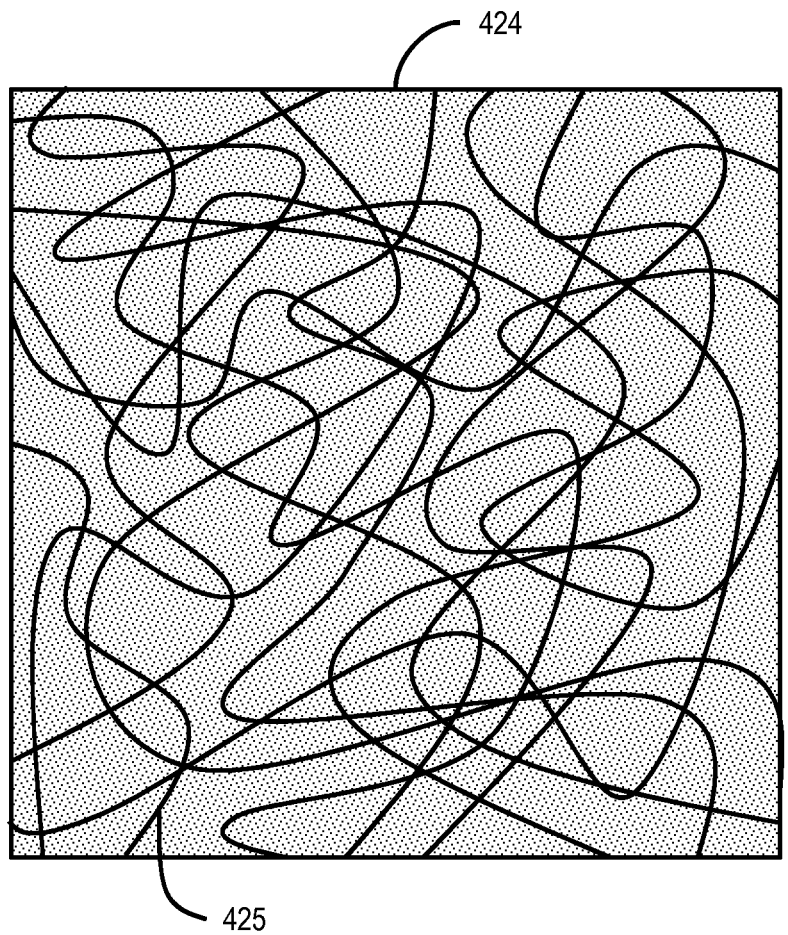
FIG. 21 illustrates a fibrous mat in accordance with another aspect of the present disclosure.

Another aspect of the present disclosure comprises energy, impact, and/or sound absorbing compositions comprising a suspending agent and a multi-level matrix of linked three dimensional geometric shapes, as in the form of a mat comprising fibers, such as an elastomeric material, e.g., silicone, These compositions, which are also suitable for use as a padding and trauma mitigating formulation, may be characterized as a substantially non-elastic, incompressible composition, which substantially does not quickly self-level under standard operating conditions. The suspending agent may be one which reacts substantially as a solid when subjected to forces below a critical force, and which becomes substantially flowable when subjected to forces above the critical force. Incident energy may be diverted within the composition including displacement of the suspending agent. The mat may comprise an elastomeric material, such as silicone, which stabilizes the composition and slows down its movement during displacement while preventing bottoming out when an external force is imposed. A composition containing a mat of elastomeric fibers is illustrated in FIG. 20, the composition 420 comprising a Bingham-type suspending agent 421 and fibrous mats 422. An exploded schematic of a mat 424 is illustrated in FIG. 21 and comprises a plurality of intermingled fibers 425.

Mats comprising synthetic fibers, such as fiberglass, impregnated with a Bingham fluid are suitable for various energy, impact, and sound absorption applications, such as acoustic applications, as in walls, ceilings, and floorings, as well as in automobiles, aircraft, trains, and other vehicles. Such impregnated mats may also comprise previously disclosed ceramic microparticulates, flexible-walled microparticulates, or celled macroparticulates, or any combination thereof, dispersed within the Bingham fluid (suspending agent), as well as an aerogel.

A method of implementing the use of such impregnated fiber mats may include supplying an unimpregnated integrated fibrous mat to a location, as when intended for use in a wall, and then impregnating with one of the compositions disclosed herein comprising a suspending agent with or without particulate material, it prior to application. The mat may be sized prior to or subsequent to ultimate use.

Another method of implementing the use of such impregnated fiber mats may include forming a large cylinder of an unimpregnated integrated fibrous mat, impregnating the fibrous mat with one of the compositions disclosed herein, and subsequently skiving from the impregnated cylinder sheets of the impregnated fiber mat at a thickness suitable for a particular application, e.g., flooring underlayment, in ceilings or walls, or athletic mats or tracks. Skiving is a well known technique wherein a cylinder is rotated as a knife blade slices off sheets at a desired thickness. This technique advantageously facilitates the formation of impregnated fiber mats at very small thicknesses.

These matrix-containing compositions may comprise any of the previously disclosed suspending agents, including Bingham Fluids generally, e.g., Bingham Plastics, Caisson Fluids, and pseudosolids. The suspending agent may also comprise a heat transfer fluid, such as Duratherm S.

These matrix-containing compositions may also comprise one or more of the particulate materials previously disclosed. For example, such compositions may comprise any of the previously disclosed ceramic microparticulates, flexible-walled microparticulates, celled macroparticulates, fibrous materials, or any combination thereof, dispersed within the suspending agent. These matrix-containing compositions may also comprise an aerogel, as previously disclosed. These compositions and applications thereof may comprise any of those illustrated in FIGS. 1 through 17 herein.

Suitable elastomeric materials which may be employed to form the thin walled spheres include synthetic polymers, such as nylon, styrene-butadiene, polyvinyl acetate, acrylonitrile butadiene styrene, acrylic). Suitable synthetic fibers may also include long- and nano-fibered polyester such as those produced by Toray Industries.

Figure 22A:
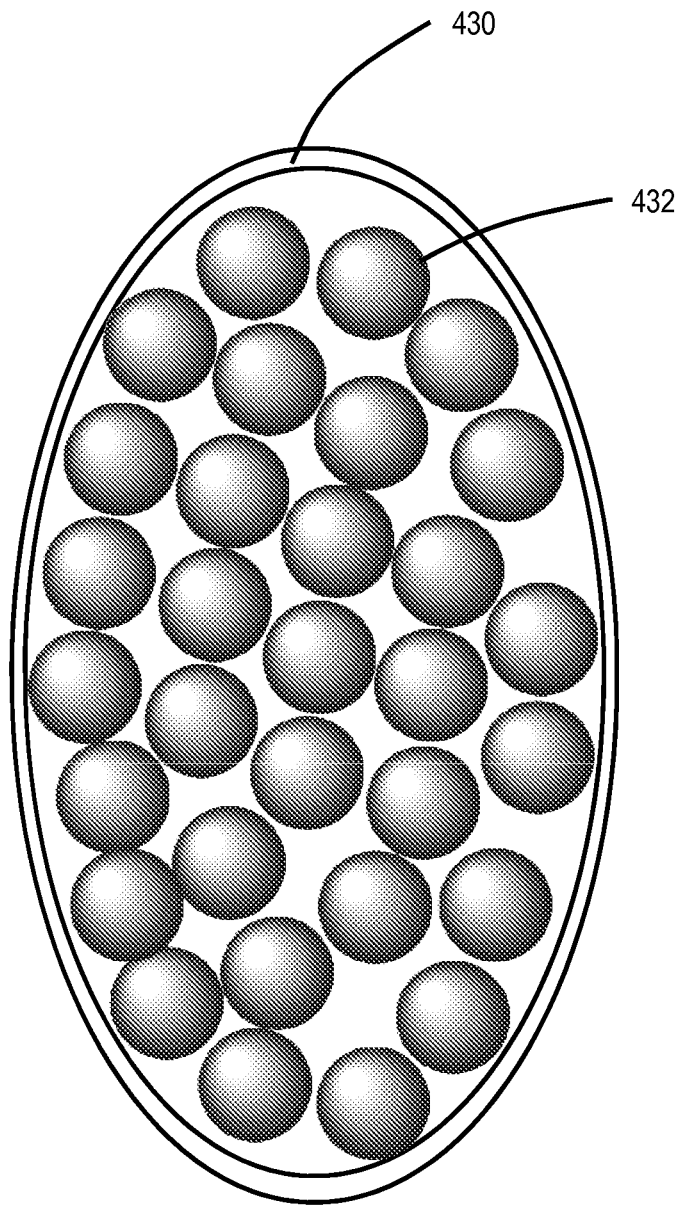
FIG. 22A illustrates a container comprising a plurality of thin-walled macrospheres in accordance with another aspect of the present disclosure.
Figure 22B:
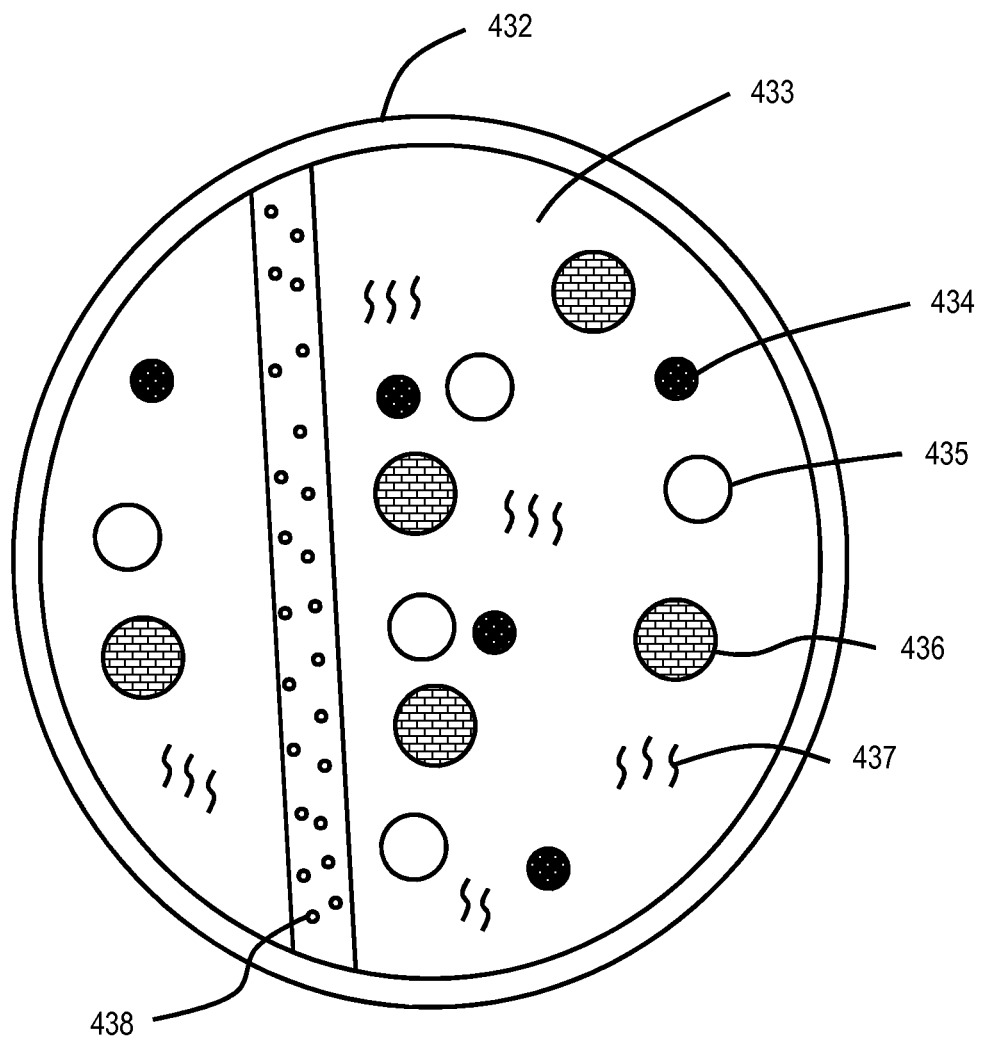
FIG. 22B illustrates a thin-walled macrosphere containing a composition in accordance with another aspect of the present disclosure.

Another aspect of the present disclosure comprises energy, impact, and/or sound absorbing compositions comprising any of the previously disclosed energy, impact, and/or sound absorbing compositions, or simply a Bingham fluid, disposed within thin-walled macrospheres, e.g., flexible macrospheres, such as elastomeric spheres, e.g., silicone spheres. Macrospheres may also comprise urethanes, polyethers, polyesters, or liner low density polyethylene. Numerous of these filled thin-walled spheres may be contained, as in a cushion of a knee pad, e.g., for use by a carpet installer, and mitigate impact. For example, adverting to FIG. 22A, container 430, made of polyurethane, is filled with thin-walled macrospheres 432 made of an elastomeric material, e.g., silicone. FIG. 22B is an exploded schematic of a macrosphere 432 which may contain a composition comprising any of the previously disclosed suspending agents 433, and may comprise any of the previously disclosed ceramic microparticulates 434, flexible-walled microparticulates 435, celled macroparticulates 436, fibrous materials 437, or any combination thereof, dispersed within the suspending agent, as well as an optional aerogel 438. Macrospheres containing such compositions can be produced by conventional encapsulation techniques.

The macrospheres 432 may be of the same or different diameters ranging from about 0.5 inch to about 5 inches, such as about 0.5 inch to 1 inch, and have a wall thickness of about 1 mil to about 10 mils, such as 1 mil to about 3 mil.

The exact mechanism underlying the ability of the compositions disclosed herein to exhibit significant energy and impact properties is not known with certainty. It is postuated, however, that an externally impinging force produces wave motion within a flexible container containing the disclosed compositions. It is believed that the impinging force produces a plurality of pressure vectors within a vector profile representing the impinging force. Compositions disclosed herein may contain millions of neighboring particles in fluid commication and impact one another repetitively in a small space. These interactions between the particles, e.g., microspheres, are a multitude of interactional external forces acting as nonconservative forces resulting in a change in the amount of energy within the composition and, perhaps, a diminishing velocity of the particles. During and after the interactions it is believed that wave superposition or interference occurs, which may result in the conversion of impact energy to thermal energy. In situations where the imposed energy is acoustic, it is postulated that the particles interact with sound waves resulting in refraction and diffraction causing wave interference.

Compositions and articles according to the present disclosure exhibit significant technical advantages, such as providing energy, impact, and or sound absorbing properties. Accordingly, compositions and articles according to the present disclosure enjoy utility in various sporting activities, such as protective articles, e.g., in helmets, shoulder pads, knee and elbow pads, as well as gymnasium mats and indoor and outdoor tracks. Military applications include body armor, such as in helmets and vests. Utilities also include mouse pads, prosthetic articles, mastectomy garments, brassieres, seating, seat cushions, and other uses for protecting and/or ameliorating pressure on various parts of human or animal. Other utilities include acoustic articles for use in buildings, including flooring, ceilings, and walls, as well as insulation for automobile, aircraft, buses, and other vehicles.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

Having described the invention in detail and by reference to the embodiments thereof, it will be apparent that modifications and variations are possible, including the addition of elements or the rearrangement or combination or one or more elements, without departing from the scope of the invention which is defined in the appended claims.

What is claimed is:

1. A substantially non-elastic incompressible composition which substantially does not quickly self-level under standard operating conditions, the composition comprising:
    a suspending agent which reacts as a solid when subjected to forces below a critical force, and which becomes flowable when subjected to forces above said critical force, and silicone fibers dispersed within the suspending agent, wherein the composition absorbs incident energy.

2. The composition according to claim 1, wherein the silicone fibers are aerated.

3. A container containing a substantially non-elastic incompressible composition which substantially does not quickly self-level under standard operating conditions, the composition comprising:
    a suspending agent which reacts as a solid when subjected to forces below a critical force, and which becomes flowable when subjected to forces above said critical force, and fibrous material dispersed within the suspending agent, wherein the composition absorbs incident energy, and, wherein the container is configured to protect soft tissues of the body of a member of the animal kingdom.

4. A substantially non-elastic incompressible composition which substantially does not quickly self-level under standard operating conditions, the composition comprising:
    a suspending agent which reacts as a solid when subjected to forces below a critical force, and which becomes flowable when subjected to forces above said critical force, and natural fibers dispersed within the suspending agent, wherein the composition absorbs incident energy.

5. A substantially non-elastic incompressible composition which substantially does not quickly self-level under standard operating conditions, the composition comprising:
    a suspending agent which reacts as a solid when subjected to forces below a critical force, and which becomes flowable when subjected to forces above said critical force, and fibrous material dispersed within the suspending agent, wherein the composition absorbs incident energy, the composition further comprising ceramic microparticulates dispersed within the suspending agent.

6. The composition according to claim 5, further comprising flexible-walled microparticulates dispersed within the suspending agent.

7. A substantially non-elastic incompressible composition which substantially does not quickly self-level under standard operating conditions, the composition comprising:
    a suspending agent which reacts as a solid when subjected to forces below a critical force, and which becomes flowable when subjected to forces above said critical force, and fibrous material dispersed within the suspending agent, wherein the composition absorbs incident energy, the composition further comprising celled macroparticulates dispersed within the suspending agent.

8. The composition according to claim 7, wherein the suspending agent comprises a heat transfer fluid.

9. A substantially non-elastic incompressible composition which substantially does not quickly self-level under standard operating conditions, the composition comprising:
    a suspending agent which reacts as a solid when subjected to forces below a critical force, and which becomes flowable when subjected to forces above said critical force, and fibrous material dispersed within the suspending agent, wherein the composition absorbs incident energy, and wherein the fibrous material is integrated in a mat.

10. A substantially non-elastic incompressible composition which substantially does not quickly self-level under standard operating conditions, the composition comprising:
    a suspending agent which reacts substantially as a solid when subjected to forces below a critical force, and which becomes substantially flowable when subjected to forces above said critical force; and
    synthetic fibrous material dispersed within the suspending agent;
    wherein: the composition provides an incident energy absorbing property; and
    the fibrous material is integrated in a mat;
    the composition further comprising at least one member selected from the group consisting of ceramic microparticulates, flexible-walled microparticulates, and celled macroparticulates.

11. A macrosphere containing a substantially non-elastic incompressible composition which substantially does not quickly self-level under standard operating conditions, the composition comprising:
    a suspending agent which reacts as a solid when subjected to forces below a critical force, and which becomes flowable when subjected to forces above said critical force, and fibrous material dispersed within the suspending agent, wherein the composition absorbs incident energy.

* * * * *